United States Patent [19]
Spangler et al.

[11] Patent Number: 5,174,439
[45] Date of Patent: Dec. 29, 1992

[54] MODULAR PLASTIC TURN BELT CONVEYOR SYSTEM, MODULE, BELT AND DRIVE THEREFOR

[75] Inventors: Michael L. Spangler, Cambridge; Thomas O. Perdue, Salisbury, both of Md.

[73] Assignee: Cambridge Wire Cloth Company, Cambridge, Md.

[21] Appl. No.: 725,432

[22] Filed: Jul. 3, 1991

[51] Int. Cl.⁵ .............................................. B65G 17/06
[52] U.S. Cl. ................... 198/853; 198/834; 198/850; 198/852
[58] Field of Search ............... 198/778, 831, 834, 850, 198/851, 852, 853

[56] References Cited
U.S. PATENT DOCUMENTS

| | | | |
|---|---|---|---|
| 4,557,374 | 12/1985 | Bode | 198/852 |
| 4,742,907 | 5/1988 | Palmaer | 198/852 X |
| 4,893,710 | 1/1990 | Bailey et al. | 198/853 |
| 4,901,844 | 2/1990 | Palmaer et al. | 198/852 X |
| 4,934,517 | 6/1990 | Lapeyre | 198/852 |

Primary Examiner—Joseph E. Valenza
Assistant Examiner—Tuan N. Nguyen
Attorney, Agent, or Firm—Rothwell, Figg, Ernst & Kurz

[57] ABSTRACT

A modular plastic turn belt has internal modules with link ends of varying shapes, a central body formed for high stiffness, large open area, and light-weight construction. Special edge modules with closer link end spacing and tapered pivot rod slots provide improved edge strength, load distribution, and collapsibility. A bi-directional pitch line drive from both surfaces is provided by a symmetrical drive barrel. Unique hold down arrangements, traction improved constructions, and rod retention arrangements are disclosed.

16 Claims, 28 Drawing Sheets

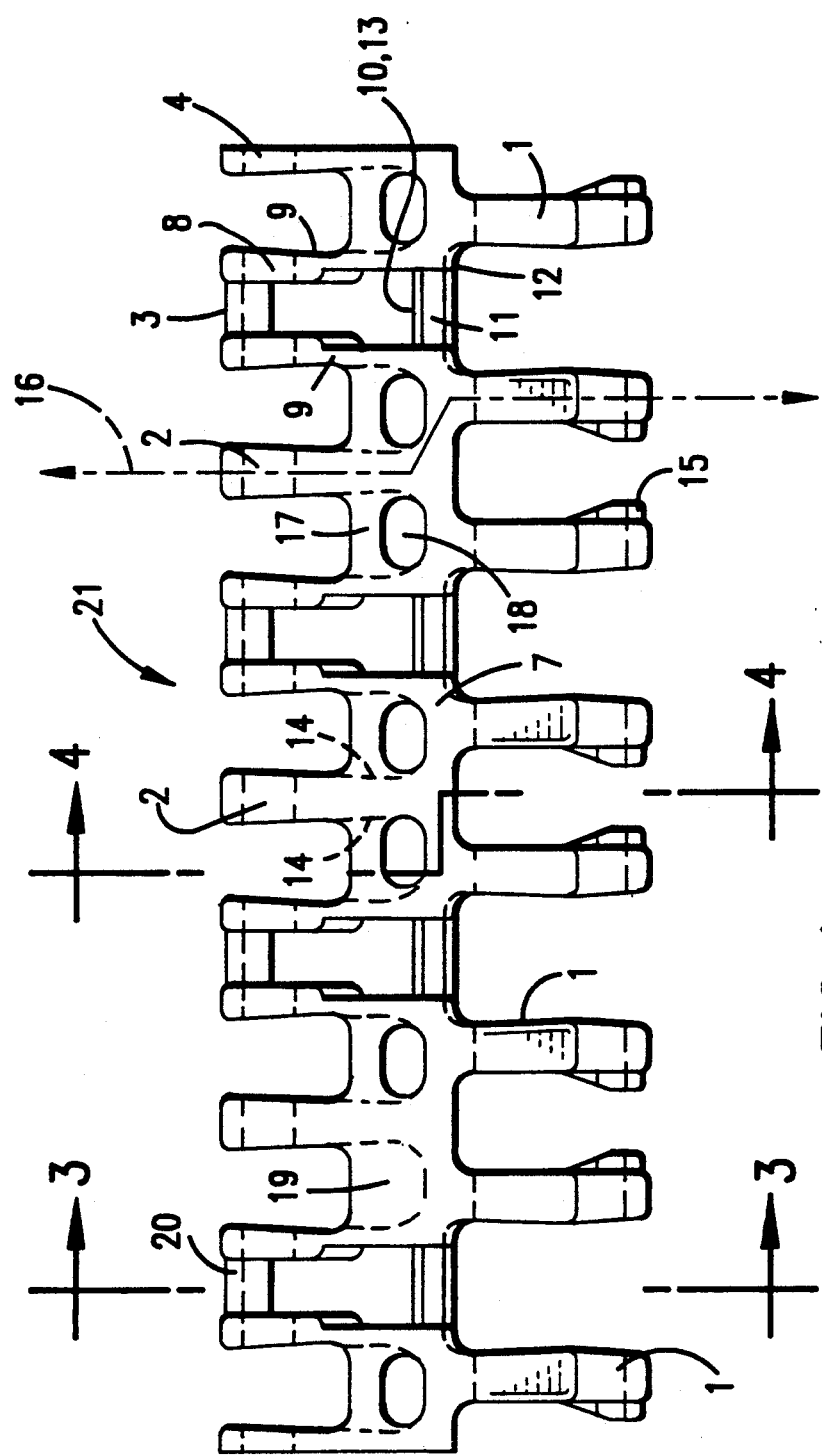

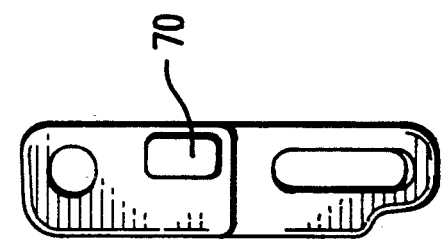
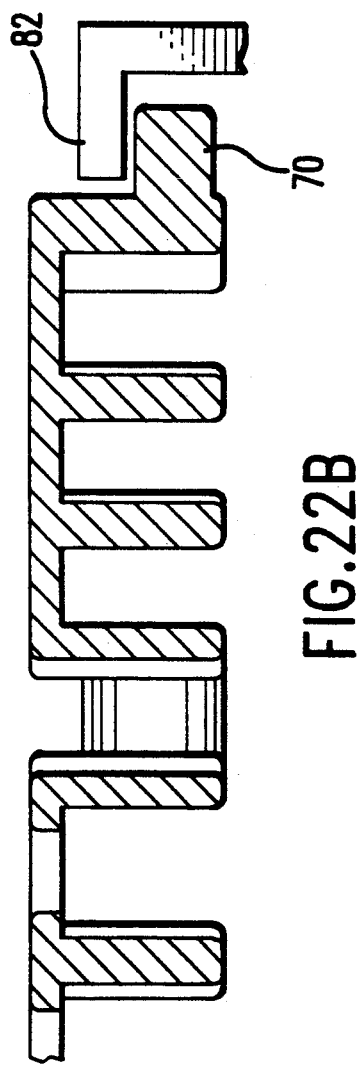
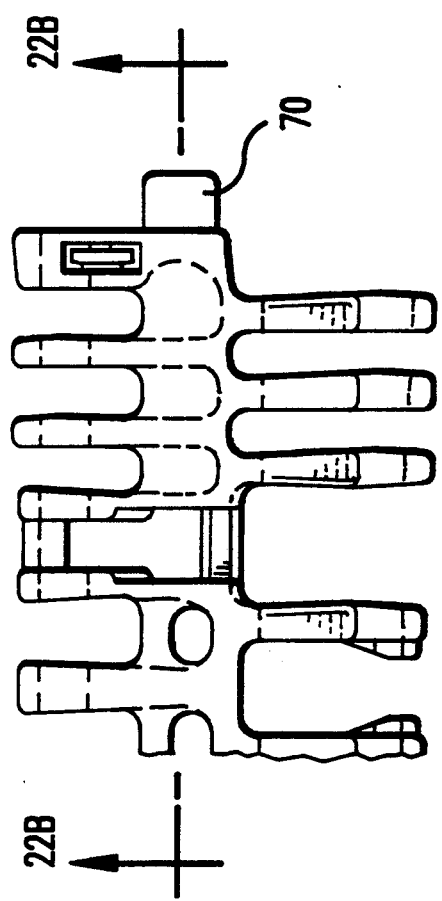

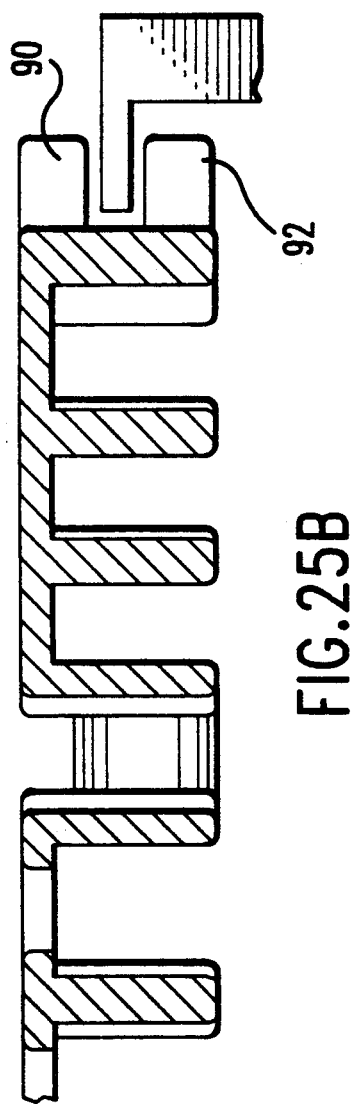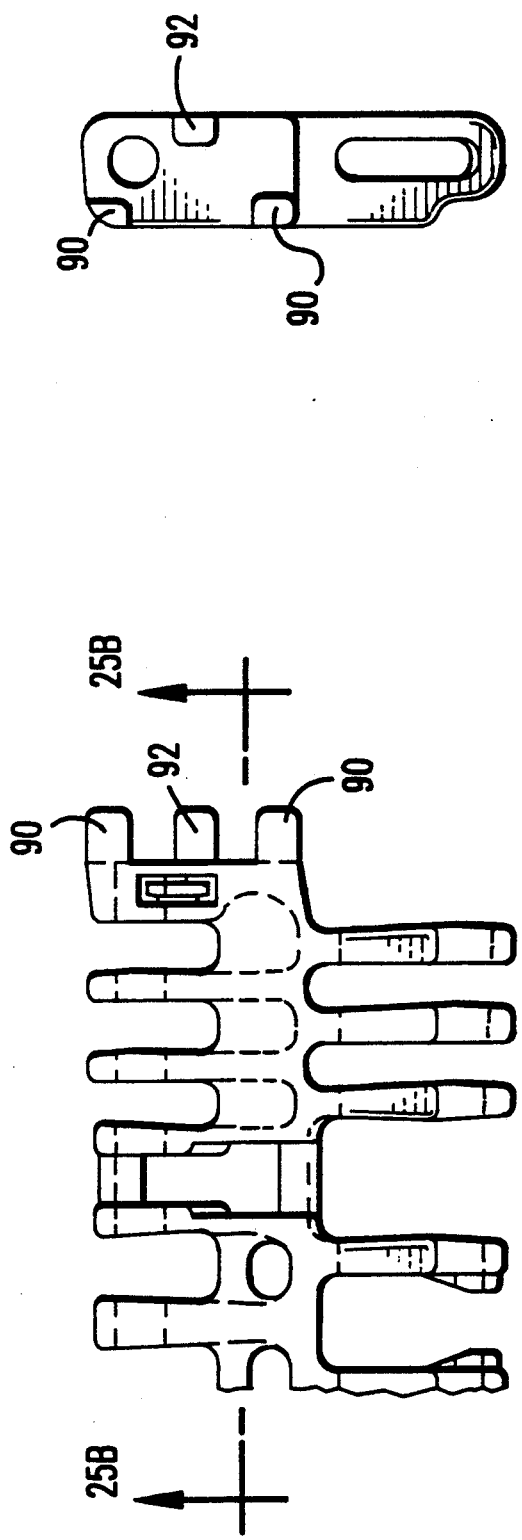

MODULAR PLASTIC TURN BELT CONVEYOR SYSTEM, MODULE, BELT AND DRIVE THEREFOR

BACKGROUND OF THE INVENTION

1. Field of the Invention

This invention relates to improvements in the art of modular plastic turn belt conveyors.

2. Background and Prior Art

Conveyor systems in which a conveyor belt must alternatively travel in a straight line as well as making a lateral turn along its path are frequently used in various manufacturing or production operations. One major class of applications for such conveyor systems are commonly referred to as "turn belt conveyors." Such systems are generally utilized for conveying articles from one point in the process to another point while executing a lateral turn to avoid a building structural element, accommodate different orientations of systems inputting to and discharging from the conveyor, or minimizing conveyor transfer points.

Another major class of applications for conveyor belts which must travel in a straight line as well as making a lateral turn along their paths is commonly referred to as "spiral cage conveyor systems." Spiral cage conveyor systems, in which conveyor belts are driven in a spiral path with the belt curving edgewise around a series of vertically spaced loops, are commonly used to provide a great length of endless conveyor belt in a relatively small space. A particular advantage of such systems is that they can be used with high production volume operations while at the same time providing the long process dwell time required for certain processes, such as product warming or freezing.

One example of a spiral cage conveyor system is disclosed in U.S. Pat. No. 3,348,659, granted Oct. 24, 1967. In this system, the belt is frictionally driven. Tension is induced in the spiral belt so that there is frictional contact between the radial inner edge of the belt and a plurality of driving elements attached to a drive drum. This belt system is then frictionally driven by driving elements which slidingly engage the radial inner edge of the spiral belt loops. The driving elements move faster than the belt and continuously slide past the belt edge to achieve a frictional drive.

A well known means of constructing a conveyor belt which is capable of both running in a straight path and making lateral turns consists of incorporating a means whereby the belt pitch can collapse on the inner radius edge, permitting it to conform to the radius of curvature of the required turn. In such belts, the total tension in the belt, which results from the frictional and drive forces, is transferred to the outer radius edge of the belt. This creates two problems. First, since very large tensile forces must be borne by the outermost edge of the belt, the load carrying ability of the belt is limited by the strength inherent in the outer edge. Several techniques have been used to reinforce the outermost edges of turn belts in order to raise the load-carrying capacity to some usable value. One such technique is disclosed in U.S. Pat. No 3,439,795, granted Apr. 22, 1969 where reinforcing bar elements are placed on the outside edges of a flat wire conveyor belt.

A similar solution to this problem is also shown in U.S. Pat. No. 4,742,907, granted May 10, 1988, where reinforcing bar elements are placed on the outer edges of modular plastic conveyor belting. While being effective in increasing the load-carrying capacity of turn belts, these constructions still have certain limitations. One significant limitation occurs at the contact interface between the reinforcing link and connecting pivot pin. Since the entire belt load must be borne at this location, pivot pin and reinforcing link wear become excessive. Also, high shear stresses are present in the pivot pin because of the limited number of shear planes carrying the tensile load. Furthermore, the reinforcing links frequently fail due to the high fatigue loading they are subjected to.

There is a need in the art for an improved method for distributing the tensile load on link elements and shear load on pivot pins on the outermost edge of a modular plastic turn belt while traversing a turn.

The second problem occurs because the tension resident in the outer belt edge tends to cause the outside edge of the belt to "flip-up" vertically, upsetting the product, and causing damage to the belt and/or conveyor system.

To more clearly understand this phenomenon, one could visualize a turn belt where the outside edge consists of a large rubber band which has been tightly stretched. Such a stretched elastic element always seeks a position which reduces its energy state to zero. In other words, it wants to seek its shortest length. The belt cannot move directly inward because of its lateral stiffness and the rigid conveyor structure. Moreover, the outside belt edge cannot move downward because of the belt support elements. The only position that the belt can assume to minimize the length of its outer chord is to rotate or "flip" up about the inside belt edge. The only forces which counteract this tendency are the weight of the belt and weight of the product resting on the belt. For most metal conveyor belt designs, the weight of the belt itself is sufficient to prevent the belt from rising up under all but the most extreme conditions. However, the specific weight of plastic conveyor belting is generally much less than a similar metal belt. Accordingly, the tendency for a conveyor belt to rise up in the turn is greater with lightweight plastic conveyor belting. Several constructions have been employed in the past to prevent the outside edge of the belt from "flipping up."

One common arrangement is to put a rail above the outside belt edge to hold the belt down. This construction can be objectionable because it reduces the effective belt width and can result in conveyor projections in the product path. Another way of attacking this problem is disclosed in above-mentioned U.S Pat. No. 4,742,907 wherein "L" shaped projections on the underside of the belt cooperate with a similar projection on the conveyor structure. Such a design results in an overall thicker conveyor belt and hence a deeper, more costly conveyor structure. Additionally, the projections on the bottom of the belt prevent the bottom surface from being used as the product surface. This is often desirable in order to extend the life of the belt by alternating wear surfaces.

There is a need in the art for an improved construction and arrangement for retaining the outer edge of a modular plastic turn belt.

Another problem which commonly occurs with modular plastic conveyor belting is providing a means to reliably retain the plastic pivot rod within the belt.

Failure to accomplish such results in numerous problems, not the least of which is the belt actually falling apart in use. Other problems include interference between partially exposed rods and the surrounding conveyor structure. Additionally, as a practical matter the rods must be easily insertable and removable from the belt, as such is normally required during belt assembly, belt installation or belt repair. Furthermore, it is desirable to accomplish this without the use of any special equipment or tool. Such is particularly important when considering field installation and repair since special tools represent both added costs and inconvenience to the user.

Because of the significant problems that loose conveyor pins have caused, numerous methods have been used to capture the pivot rods connecting the links in plastic conveyor belts. Such methods include forming heads on the ends of the rods, but these heads can be knocked off and they must be removed for replacement of the rods. The heads have been provided by melting the ends of the rod to provide enlarged ends or heads which are larger in diameter than the rod hole and thereby prevent the rod from moving inwardly through the belt, i.e., the enlarged heads provide means to capture the rods. However, there are numerous problems with this solution to the problem of capturing the rods. First, special equipment is normally required to thermally form the heads. Secondly, the heads are exposed on the edges of the belt in a vulnerable location since any protuberance on a conveyor can either wear or knock the heads off the rods thus allowing the rods to fall out of the belt. Thirdly, there is a problem of the Poisson effect, i.e., when a material undergoes a change in dimension due to an elastic deformation along one axis, an opposite change in dimension or deformation occurs along a perpendicular axis. The amount of this opposite deformation is determined by Poisson's ratio. When the conveyor belt is in operation the rods are subject to compressive forces perpendicular to the axis of the rod. These compressive forces can deform the rod making the diameter of the rod smaller in accordance with the theory of elasticity. In accordance with the Poisson effect the rod then elongates along its axis; in effect, the rod becomes longer than its original length. This in turn causes the rod to protrude further beyond the edge of the belt causing further problems of interference with conveyor structure which can result in significant belt damage and possible down time.

Another way of capturing the rod within the belt is to form a circumferential bead the internal diameter of which is less than the diameter of the rod, the beads being formed at the ends of the rod holes. Such is shown in U.S. Pat. No. 2,911,091, granted Nov. 3, 1959. However such capturing of the rod is more or less permanent which doesn't take into consideration the need for disassembly and repair of the belt from time to time. Another solution to the problem of capturing a rod end is disclosed in U.S. Pat. No. 3,726,569, granted Apr. 10, 1973, in which the end of the rod hole and the outermost link end are plugged to prevent the rod from escaping from the belt. See also, U.S Pat. No. 4,709,807, granted Dec. 1, 1987. However, such plugs can be inadequate due to the rod elongation force caused by Poisson's effect mentioned above, and threaded plugs can cause stress risers and possible failure, in addition to extra manufacturing time and the cost of threading both the plug and the hole.

Another known method of capturing the rod is a snap-fitting end cap installed axially into the module rod hole or transversely into the module, blocking off the rod hole. However, the general design requirement for snap-fit assembly as currently known requires that the plug or end cap be flexible so that its snap projection can deform during installation. This flexibility, which is normally accomplished by placing the snap fit projection at the ends of two flexible arms, also weakens the plug or cap and reduces its ability to resist rod elongation forces. Further, end caps which are installed axially into the rod hole place the entire rod elongation force caused by the Poisson effect on relatively small snap-fit projections. This results in the rods "popping" the end caps off of the end modules.

It is also known to block the end of the pivot hole by insertable clips, for example, see, U.S. Pat. No. 4,893,710, granted Jan. 16, 1990 and U.S. Pat. No. 5,000,312, granted Mar. 19, 1991.

Despite all the prior work in this field, there is still a need in the art for improved arrangements for capturing and holding the rods interlinking the modules of modular plastic conveyors.

Another problem with modular plastic turn belts is the execution of a design which accommodates a small collapsing radius, with a rugged structural design with high tensile strength and high stiffness in resistance to gravity loads, yet at the same time being light-weight for economy, and having a high degree of open area for improved flow-through and heat transfer characteristics, and a generous clearance in the collapsed condition to accommodate foreign material build-up. An open type design which facilitates cleanability, and hence suitability for food contact applications, and which incorporates a positive sprocket drive which utilizes a broad sprocket tooth and resulting pitch line drive which is bi-directional and which can be accomplished from both the top surface and bottom surface of the belt is also difficult to execute while incorporating the other desired features mentioned above.

Two prior art modular plastic turn belts, aforementioned U.S Pat. No. 4,742,907 and U.S. Pat. No. 4,934,517, granted Jun. 19, 1990, will be discussed, vis-a-vis the desired design parameter mentioned above.

The belt of the U.S. Pat. No. 4,742,907 possesses a high percentage of open area and pitch line drive. However, due to the limitations imposed by attempting to achieve a high degree of collapsibility and the section thicknesses required in the design of a modular plastic turn belt to achieve required functional resistance to tensile loads, such belt design contains several drawbacks. First, because of the single elongated body, modules do not have significant stiffness in resistance to bending forces, nor does a belt offer adequate stiffness in resisting the forces imposed by gravity (product) loads. Moreover, the extended pitch of the belt of this patent is controlled at the outermost edge of the belt. It can be shown that by moving the extended pitch controlling position to a position inside the outermost belt edge, the collapsing radius of the belt can be decreased.

The belt of U.S. Pat. No. 4,934,517 includes a box-type structure for improved stiffness and link end clearance for improved collapsibility. However, this same box structure results in lower open area, increased difficulty in cleaning due to opposite facing internal surfaces, and the inability to execute pitch line sprocket drive.

There is a need in the art for a modular plastic turn belt system which offers an improved combination of strength and stiffness, open area, collapsibility, and pitch line drive.

SUMMARY OF THE INVENTION

This invention provides a modular plastic turn belt composed, of a plurality of modules with interfitting link ends which modules are held together by elongated rods extending through holes in the link ends. In this type of belt, the following are the novel and unobvious features of this invention:

1. A unique structural design comprising a high strength belt edge, convoluted elongated members joining opposing link ends, inverted "L" shaped cross section for high stiffness versus section thickness, and large percentage open area for lightweight construction and improved air flow and heat transfer characteristics.

2. Special belt edge modules with closer link end spacing for enhanced strength and with tapered slots on a preselected number of link ends to provide improved distribution of loads across the link ends and resulting in a dual collapsibility ratio belt.

3. Drive means including an open drive link combined with a symmetric drive barrel located on the module centerline for bi-directional, pitch line drive from both belt surfaces, in cooperation with a sprocket.

4. Unique link thickness and spacing facilitating the molding of combination end modules for construction of belts of numerous widths with no cut piece waste.

5. Drive projection means on an outer edge of end modules for improved traction against drive elements on spiral cage conveyors.

6. Hold-down means for preventing the outer belt edge from flipping up.

7. Novel rod retention means for reliable rod retention, belt width stabilization, ease of assembly and maintenance and improved stress distribution.

8. Integrally molded side guards.

BRIEF DESCRIPTION OF THE DRAWINGS

FIG. 1 is a top plan view of an internal module of the modular conveyor belt of this invention.

FIG. 2 is an end view of the module shown in FIG. 1.

FIG. 22A is a top plan view of a portion of a module illustrating a hold down arrangement.

FIG. 22B is a sectional view of a portion of the module of FIG. 22A with the further addition of a guide rail.

FIG. 22C is an end elevation of the module shown in FIG. 22A.

FIGS. 25A, B and C are views similar to FIGS. 22A, B, and C, illustrating yet another hold down embodiment.

DETAILED DESCRIPTION OF THE PREFERRED EMBODIMENTS

Figure 3:
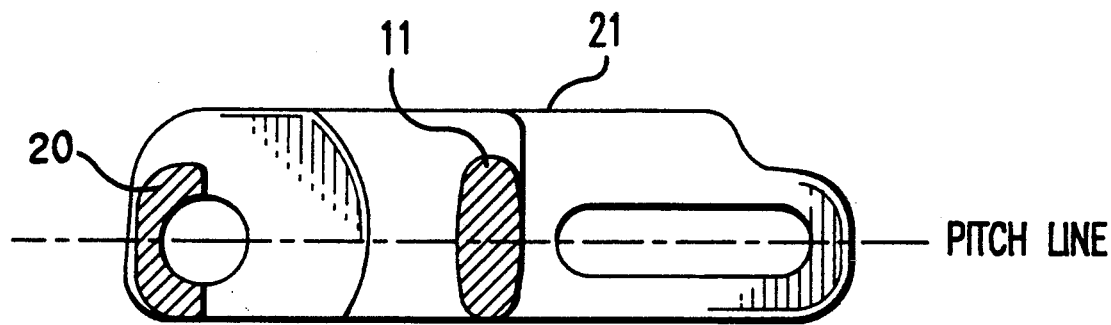
FIG. 3 is a sectional view taken along line 3—3 of FIG. 1.

Referring to FIGS. 1 and 2, top and end views of an internal module of this invention are shown. A first plurality of links 1 have an elongated slot 5 to permit movement of a pivot rod during collapsing. A second plurality of links 2, 3, 4, have a generally round hole 6 for the pivot pin. Both the elongated slot 5, and the round hole 6 are slightly enlarged as compared to the receiving pivot pin to facilitate pin insertion and to aid in cleanability. Connecting pluralities of links 1 to 2, 3, 4 is a molded body formed as a convoluting member 7 which also provides stiffness to the module structure against gravity and end loads. Drive links 3 are an open box-type structure composed of an end member 8, two elongated link elements 9 between which is situated an opening 10 which can receive a sprocket tooth and a symmetric drive barrel 11 which can cooperate with a drive sprocket tooth from either surface 12 or 13.

Although a module of fixed width is shown, the links are on a repeating pattern of 2-1-3-1-2 permitting a module of any feasible width to be constructed. Outermost link ends 4 are approximately half the width of link ends 2 which along with the repeating link end pattern, facilitates brick-laying on fixed increments of width equal to the link end repeating increment.

Links 2 and 4 have a converging taper 14 on their elongated link elements for improved side clearance during collapsing. Each of the links 1 has a side pad 15 on one side of the link end to provide additional pivot rod bearing area and to cooperate with the flanks of the link ends of links 2 of an adjacent module to maintain module-to-module position.

The convoluting member 7 provides for near straight line flow of tensile forces as indicated by the schematic force flow line 16.

Continuing to refer to FIG. 1 a stiffening member 17 forms the horizontal leg of the inverted "L" top plate structure. Although shown in perforate condition with perforations 18 the perforations can be omitted as shown at area 19 for increased module stiffness to gravity loads, module bending and twisting.

Referring to FIG. 3, the symmetry of drive barrel 11 is shown. It is generally symmetric about the pitch line. Also shown is the link end connecting member which includes a portion 20 which serves to connect the link end elements 9 of link 3 and provides additional rod contact bearing area.

Figure 4:
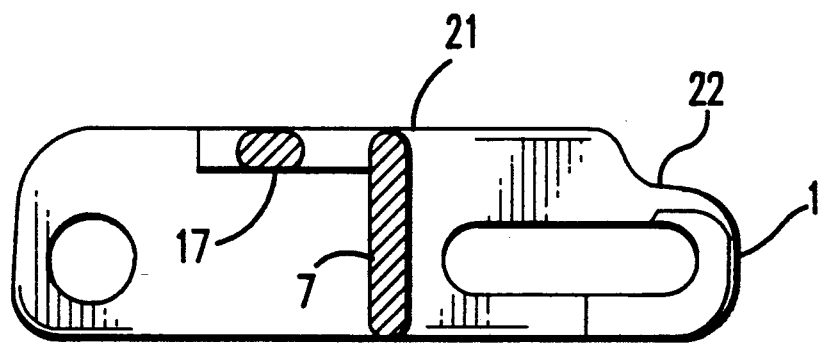
FIG. 4 is a sectional view taken along line 4—4 of FIG. 1.

Referring now to FIG. 4, module 21 is shown with horizontal and vertical legs 17 and 7 respectively of the inverted "L" top plate structure. Also shown is an undercut 22 on link ends 1. This undercut 22 provides clearance for positioning links 1 under legs 17 in a collapsed state.

Figure 5:
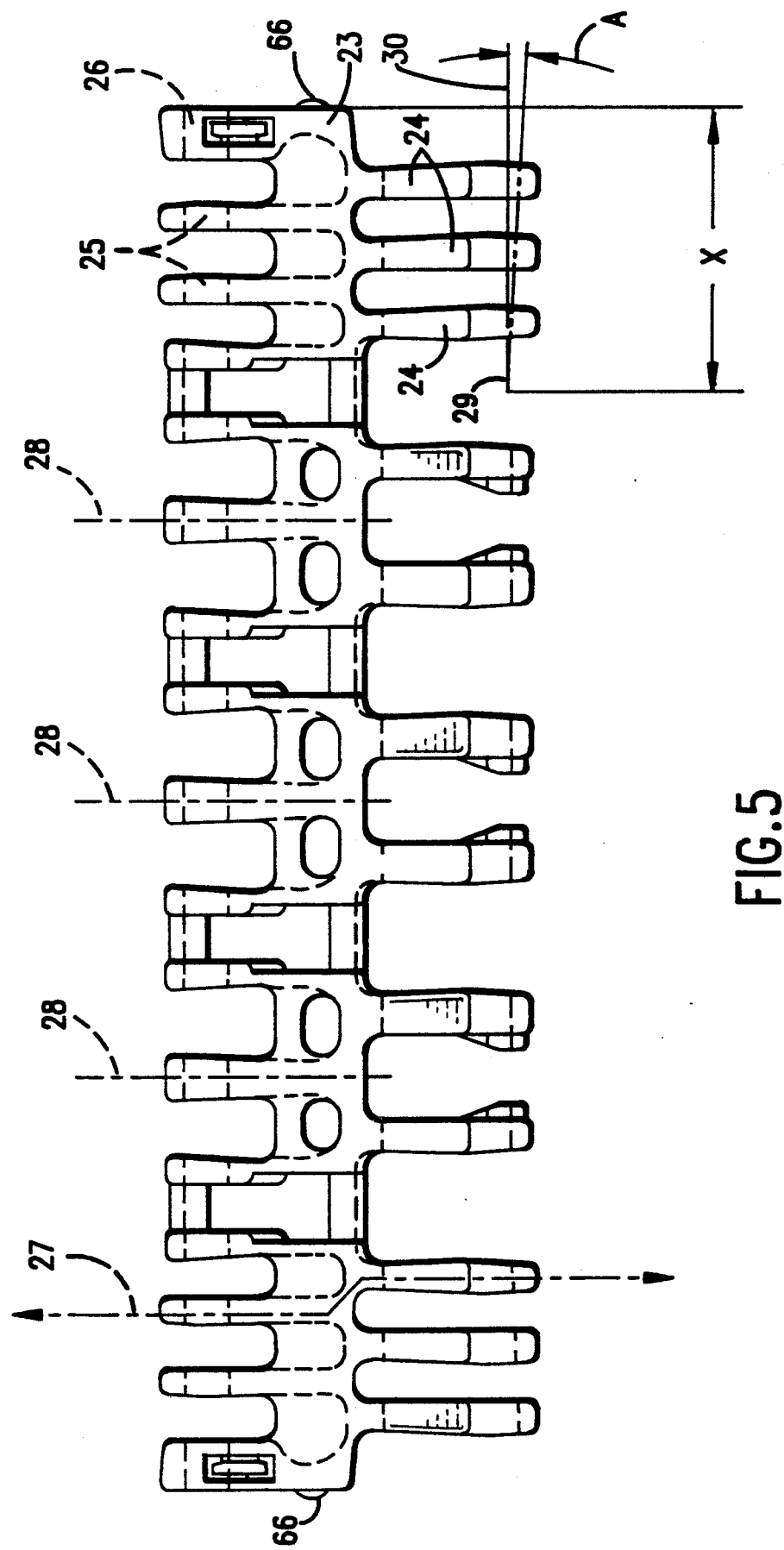
FIG. 5 is a top plan view of a combination end module of the modular turn belt of this invention.

Referring now to FIG. 5, a combination end module 23 is shown, which can be used in conjunction with modules 21 in assembly. The internal structure of module 23 is similar to that of module 21. The outer portions of either end of module 23 include a plurality of links 24 on one side and a plurality of links 25 and 26 on the other side. The spacing of these end most links is much closer than the spacing of links of module 21 and also closer than the spacing of the links internally of the end links. This provides for an increased number of pivot rod shear planes and link tensile elements which reinforces the belt edge for improved load-carrying ability in a turn. Also, the tensile flow path for the end links is much closer to a straight line as indicated schematically by force line 27—27. The basic outermost link ends are mirror imaged on the opposite end of module 23 as shown in FIG. 5.

Due to the symmetric and repeatable link sequencing a combination end module can be molded as a unitary body, reducing tooling and inventory costs. This unitary body can be utilized as is to form a belt of the same width of the module or alternately it can be cut at locations 28 with a saw or other suitable means to form left and right end modules, and used in conjunction with modules 21 to form belts of varying widths. Alternately, modules 23 could be individually molded ending at locations 28 to form individual left and right end modules.

Figure 6:
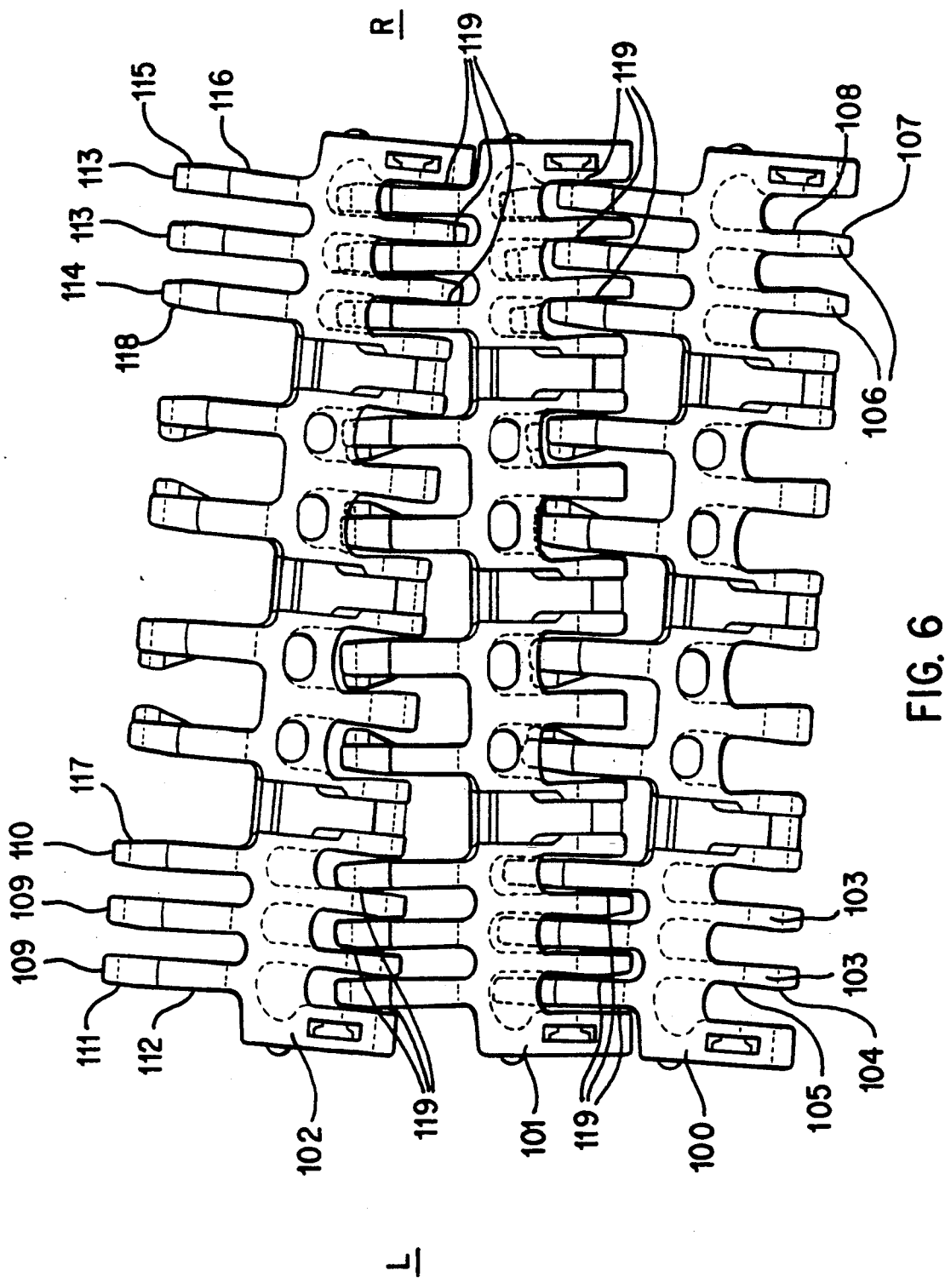
FIG. 6 is a top plan view of a partial assembly of end modules.

A further advantage of module 23 relates to the collapsed link clearances which are obtainable with different link configurations on either belt edge. Referring to FIG. 6, a partial assembly of combination end modules 100-102 is shown with the left belt edge designated "L" and right belt edge designated "R". In this assembly, modules 100 and 101 are collapsed on their left edge and extended on their right edge as in making a left hand turn. Modules 101 and 102 are collapsed on their right edge and extended on their left edge as in making a right hand turn. Links 103 have tapers 104, 105. Links 106 have similar, but oppositely facing tapers 107, 108. Links 109, 110 have tapers 111, 112. Links 113, 114 have similar but oppositely facing tapers 115, 116. Link 110 has taper 117. Link 114 has similar, but oppositely facing taper 118. These features in assembly cooperate to provide maximum link section thickness while at the same time providing link clearances while in a turn as indicated at areas 119.

Figure 7:
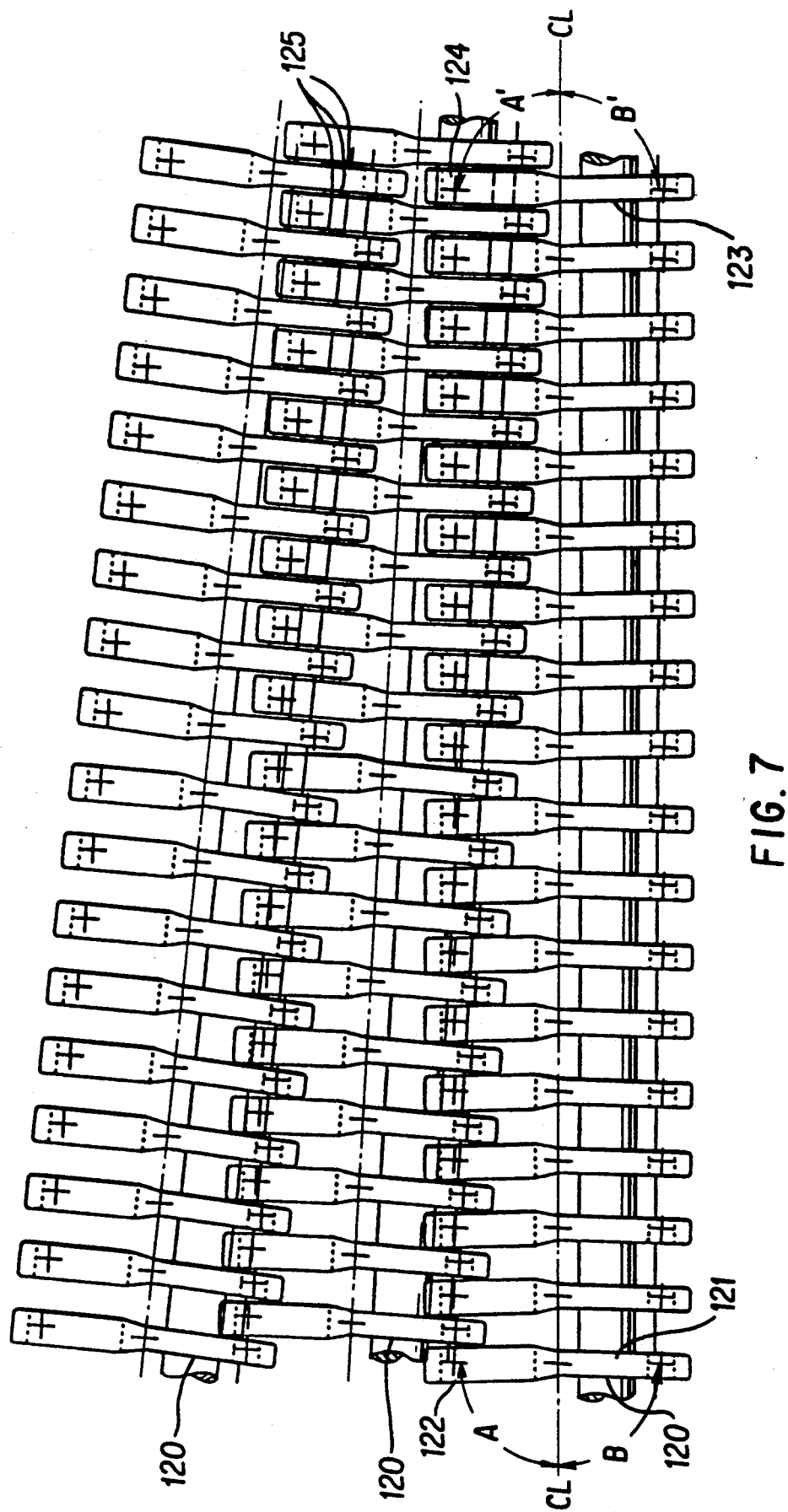
FIG. 7 is a top plan view of a partial assembly of another embodiment of end modules in a turn.

Another embodiment of a belt in which the above-described advantage may be achieved, while producing uniform collapsed link clearances, is shown schematically in FIG. 7. FIG. 7 shows a partial assembly of combination end modules 120 in a right-hand turn. Modules 120 are comprised of a left section with pluralities of link elements 121, 122 and a right section with pluralities of link elements 123, 124. Link elements 121, 122 are oriented at angles B and A respectively which are at some value less than 90° from the module centerline. Link elements 123, 124 are oriented at opposite angles B' and A' respectively which are at some value less than 90° from the module centerline. With this design, more uniform collapsed link clearances 125 may be obtained. In operational service, it is important to maximize collapsed link clearances since certain applications result in a build-up of foreign material on the links, such as ice or product fines. Without adequate collapsed link clearance this foreign material build-up can hinder or prevent the proper collapsing of adjacent module pitches. With this embodiment, having outer link elements angled in opposite directions on the left and right sides, uniform collapsed link clearances can be obtained when the belt is either in a left-hand or right-hand turn.

Combination end modules 23 may also be molded from a higher strength material than the internal modules for improved belt edge strength, or from a higher friction material for improved drive traction on spiral cages.

Another key element of module 23 (shown in FIG. 5) is that the elongated slot 5 is tapered at an angle "A" with the vertex at a point 29 with the taper in a direction away from the pitch center 30, see FIG. 5. This feature has two major advantages. First, it moves the pitch controlling point inside the belt edge by a distance "X". This increases the collapsibility of a belt. It can be shown that by moving the extended pitch controlling position to a position inside the outermost belt edge, the collapsing radius of the belt can be decreased.

Figure 9:
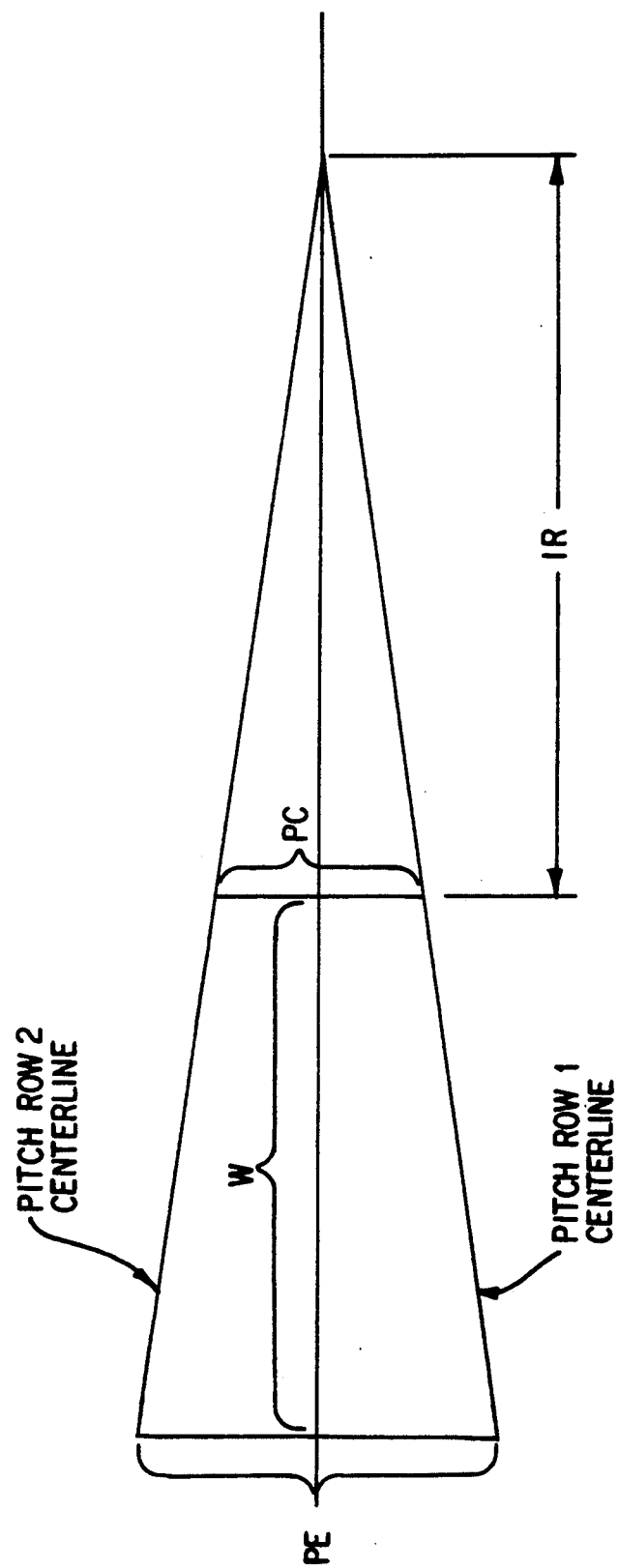
FIGS. 9 and 10 are geometric diagrams illustrating a feature of moving the pitch control point inside the belt edge.

Referring to FIG. 9 where the extended pitch is controlled at the belt edge, PE is the extended pitch, PC is the collapsed pitch length, W is the belt width, IR is the inside radius of the collapsed belt and C is the proportion IR/W which is a normalized measure of inside belt radius, it can be seen by simple proportions that $$\frac{PE}{IR + W} = \frac{PC}{IR}$$

or $$C = \frac{IR}{W} = \frac{PC}{PE - PC}$$

Figure 10:
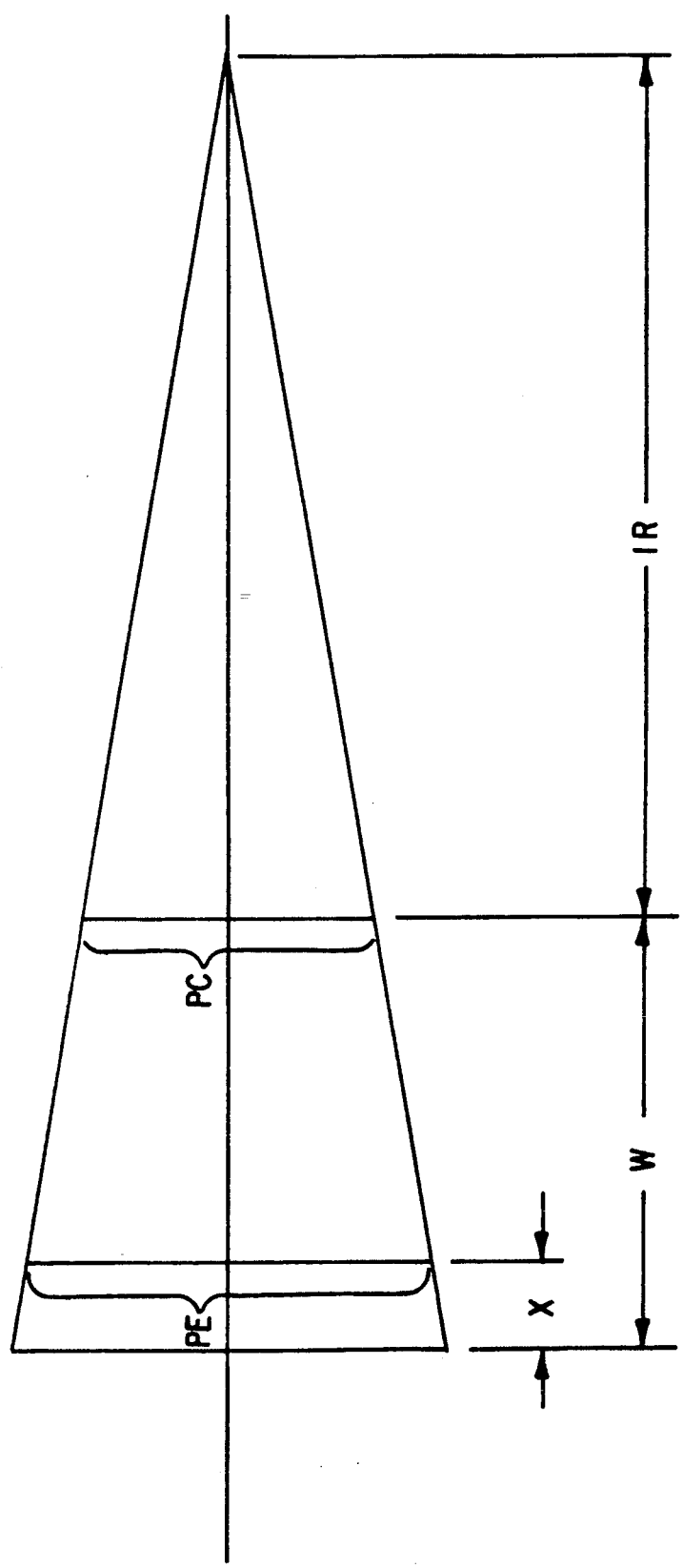

Referring now to FIG. 10 where the extended pitch is controlled some distance X from the outer belt edge, it can be seen by similar proportions that $$\frac{PE}{IR + W - X} = \frac{PC}{IR}$$

or $$C = \frac{PC - \frac{PC \cdot X}{W}}{PE - PC}$$

and therefore C' < C.

Figure 8:
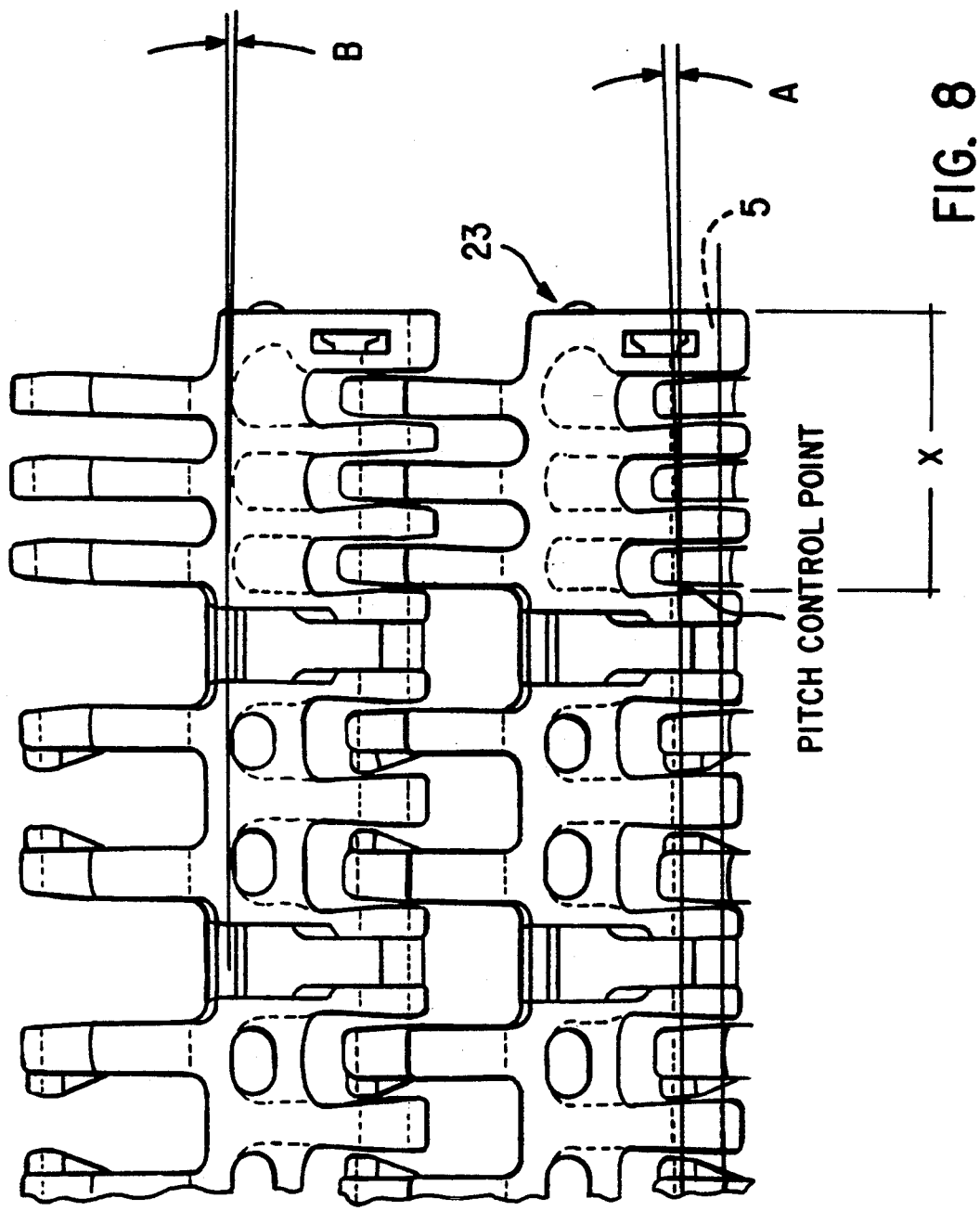
FIG. 8 is a top plan view of a portion of two end modules.

Referring to FIG. 8, for belt widths with an incremental pitch collapsing angle "B" less than angle "A", the outer edge extended pitch controlling point effectively shifts to a distance "X" inside the belt edge, see FIG. 10. The resultant collapsing ratio "C" is lower than that which would exist if the extended pitch controlling point is at the belt edge.

Figure 11:
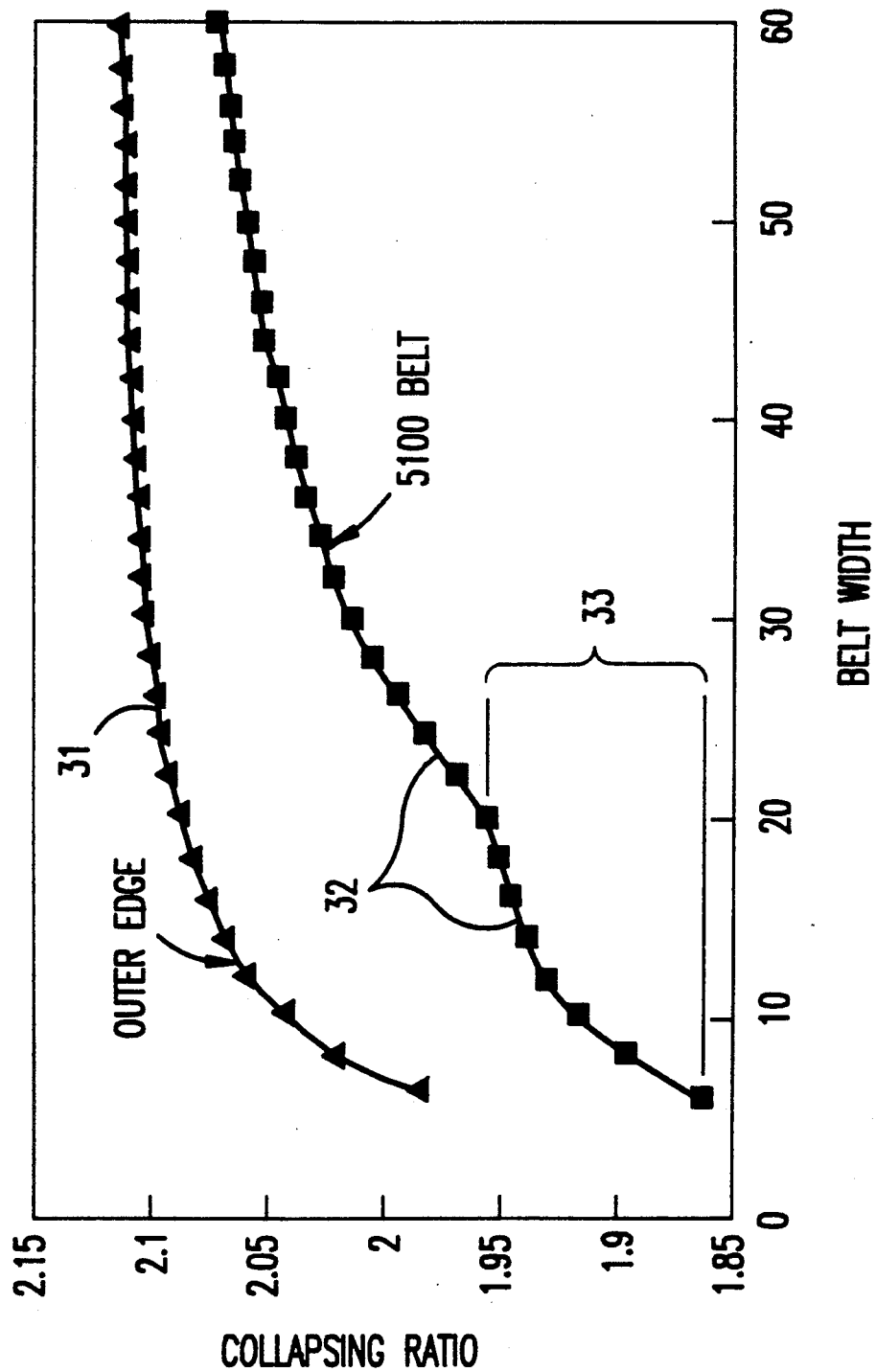
FIG. 11 is a graph of the collapsing ratio vs. belt width for different pitch control positions.
Figure 12:
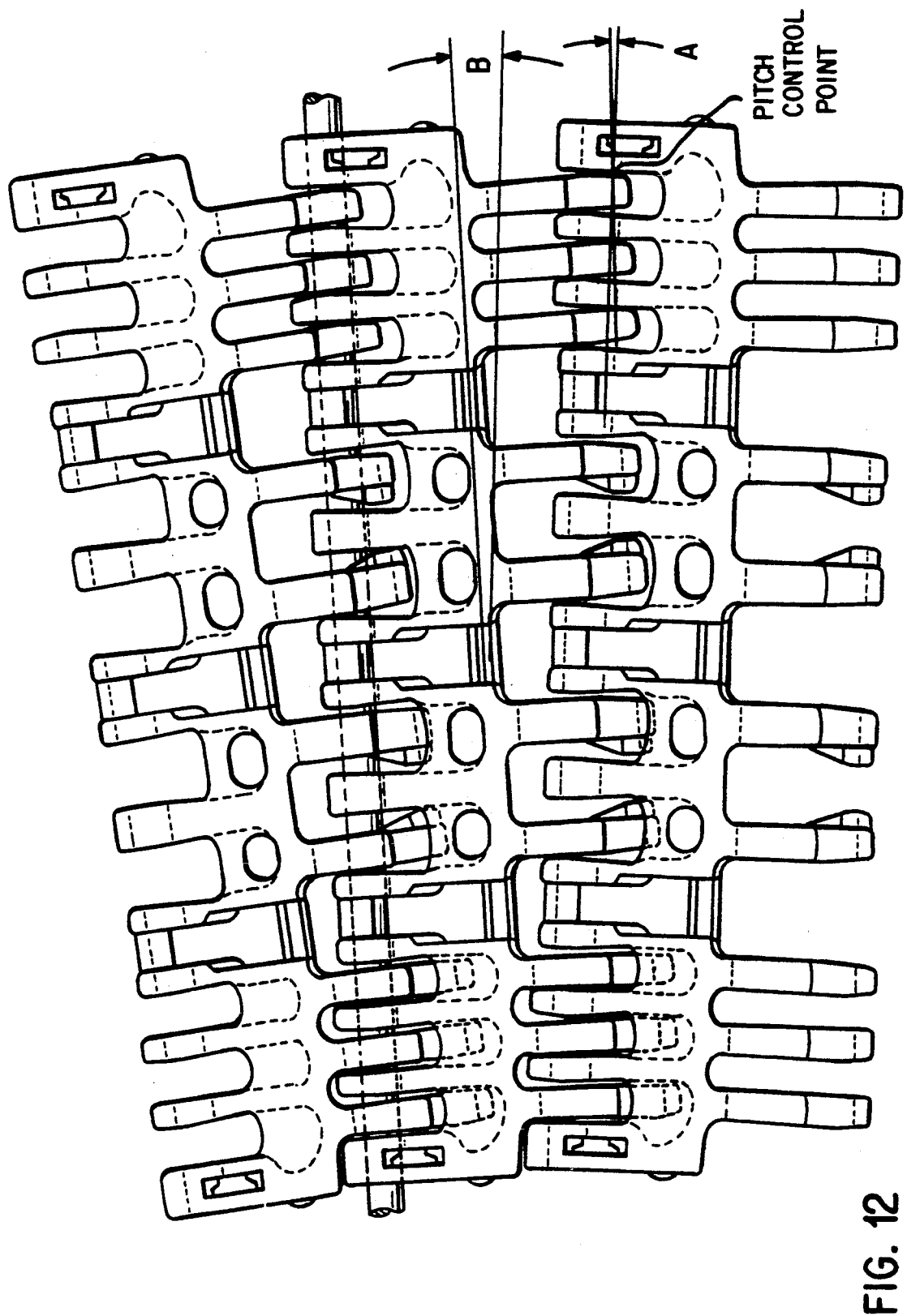
FIG. 12 is a top plan view of a partial assembly of edge modules in a turn.

FIG. 11 is a graph of collapsing ratio versus belt width for different pitch control positions. Curve 31 depicts the collapsing ratio for a design with the extended pitch controlling point very nearly at the outer belt edge for all belt widths. With taper angle "A" included curve 32 results. It can be seen that the collapsing ratio, and therefore corresponding belt inside radius is desirably smaller with inclusion of taper angle "A". Taper angle "A" can be designed to correspond to the pitch collapsing angle for a selected average belt width. As shown in FIG. 12, for belts of width less than the selected average, "B" is greater than "A" and the extended pitch controlling point is located very nearly at the belt edge. Additionally, since taper angle "A" effectively increases the pitch PE to a value PE', collapsibility is further reduced and that portion of curve 32 indicated at 33 results. For belts equal to or greater than the selected average, "B" (FIG. 8) is less than "A" and the extended pitch is controlled at distance "X." This results in curve 32 with a step change in the collapsing ratio "C" at the selected belt width.

Figure 13:
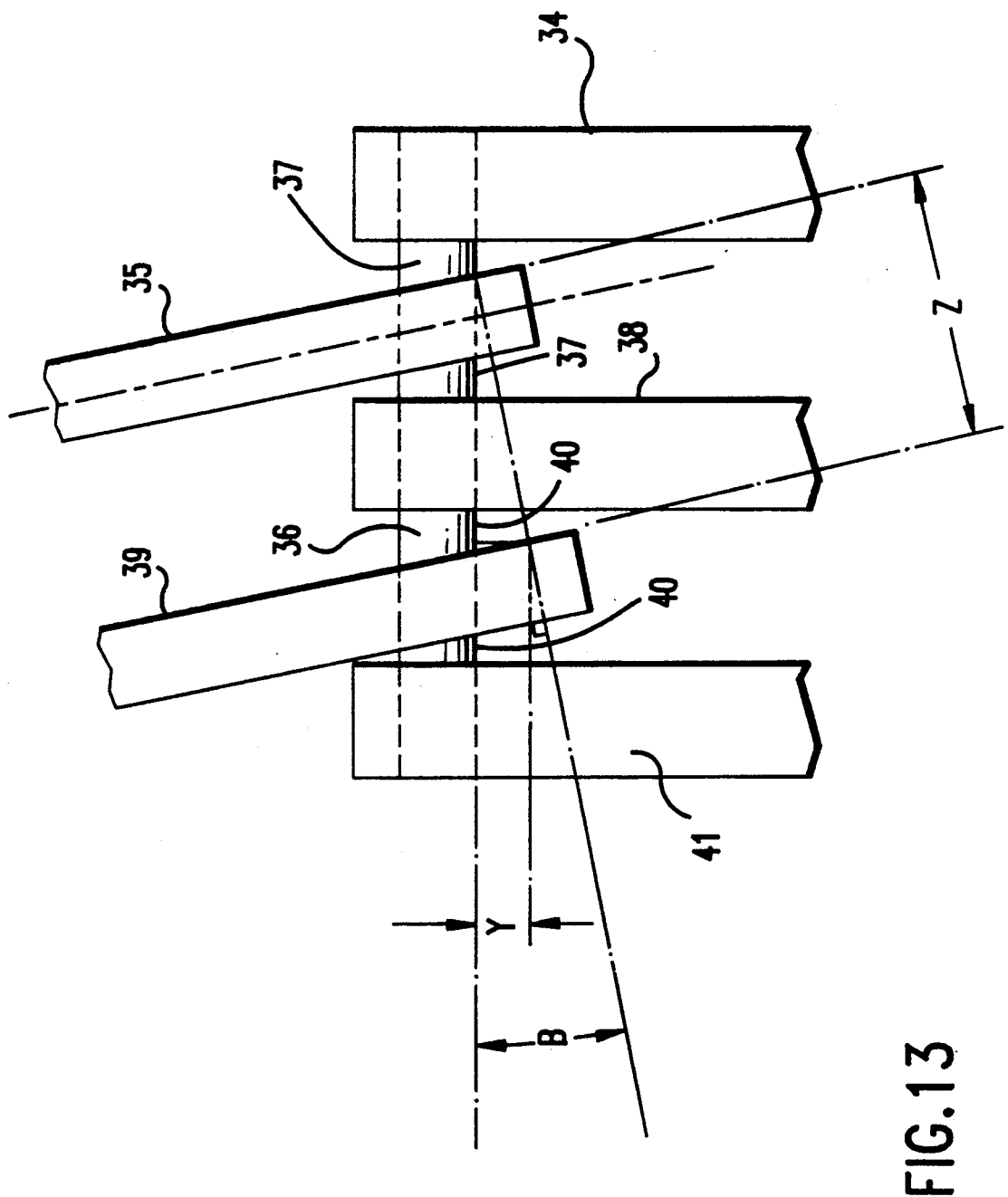
FIG. 13 is a schematic illustration of a conventional design.
Figure 14:
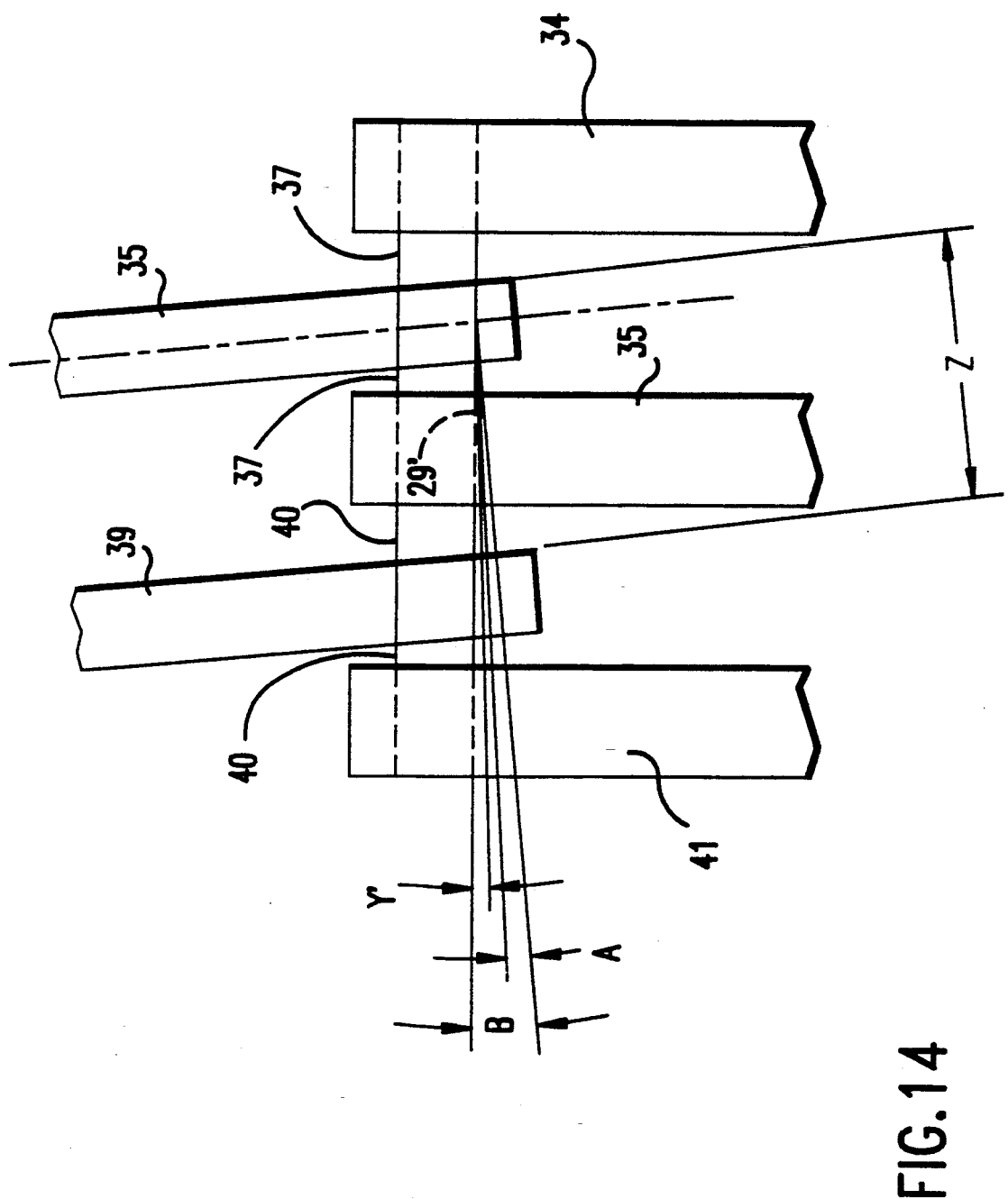
FIG. 14 is a schematic illustration showing the effect of a tapered pivot hole of this invention.

A second significant advantage of the tapered slot is that it much more evenly distributes the load across links 24, 25, 26, and the pivot pin in the belt edge. FIG. 13 illustrates a conventional design where the slot is not tapered and the extended pitch controlling point is at the belt edge and only links 34, 35, and 38 and rod 36 at shear planes 37 carry the load. As can be the case with polymeric materials when placed under high loads, they start to deform through creep. At sufficiently high load, elements 34, 36, 35, 38 may deform to the point where links, 39, 41, and shear planes 40 begin to assume some load. However, the total elongation must equal distance "Y" which is Z sine B where B is the collapsing angle. As can be seen from FIG. 14, with a tapered slot 29', distance Y' is Z sine (B-A) and therefore additional elements 39, 40, 41 assume loading at a much lower belt load. When A equals B the force is distributed to all elements equally at all loads. Thus, the tapered slot 29' performs a key function not only in achieving a smaller collapsing radius but also improves the distribution of forces in the outer belt edge. Additionally, the effect of closer link spacing on the belt edge can be seen since it effectively reduces distance "Z" (FIG. 14) and further lowers the deformation "Y" required prior to internal elements assuming some load.

Figure 15:
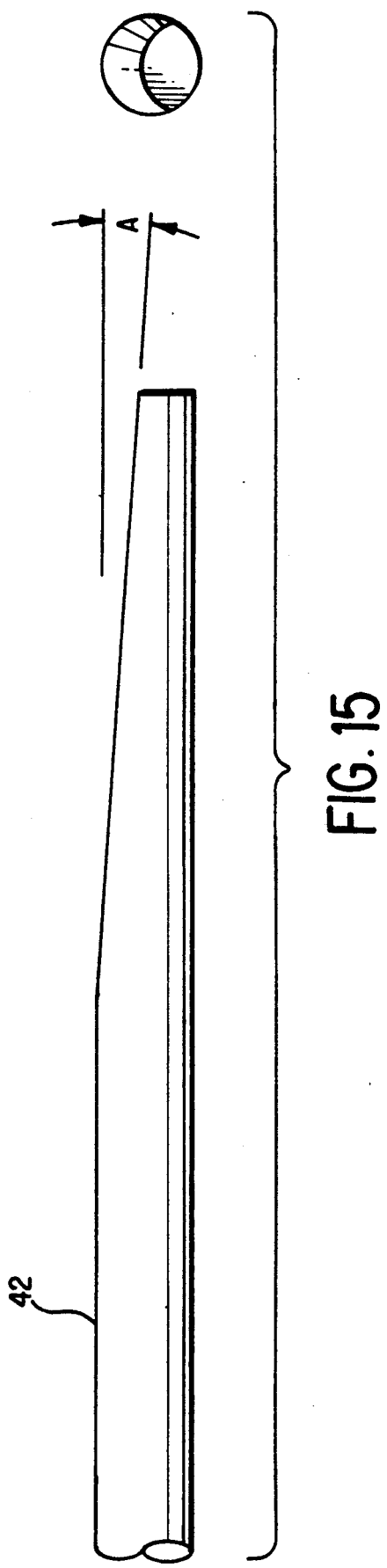
FIG. 15 is an illustration of a tapered pivot rod to obtain the same effect as a tapered pivot hole.

Another embodiment by which the above effects may be accomplished is through the use of a semi-tapered pivot rod 42 shown in FIG. 15. By tapering one side of the pivot rod by an angle "A" a straight slot can be maintained in links 24. The tapered rod can be more easily fabricated with varying angles "A" to match angle "B" (see FIGS. 13 and 14).

Figure 16:
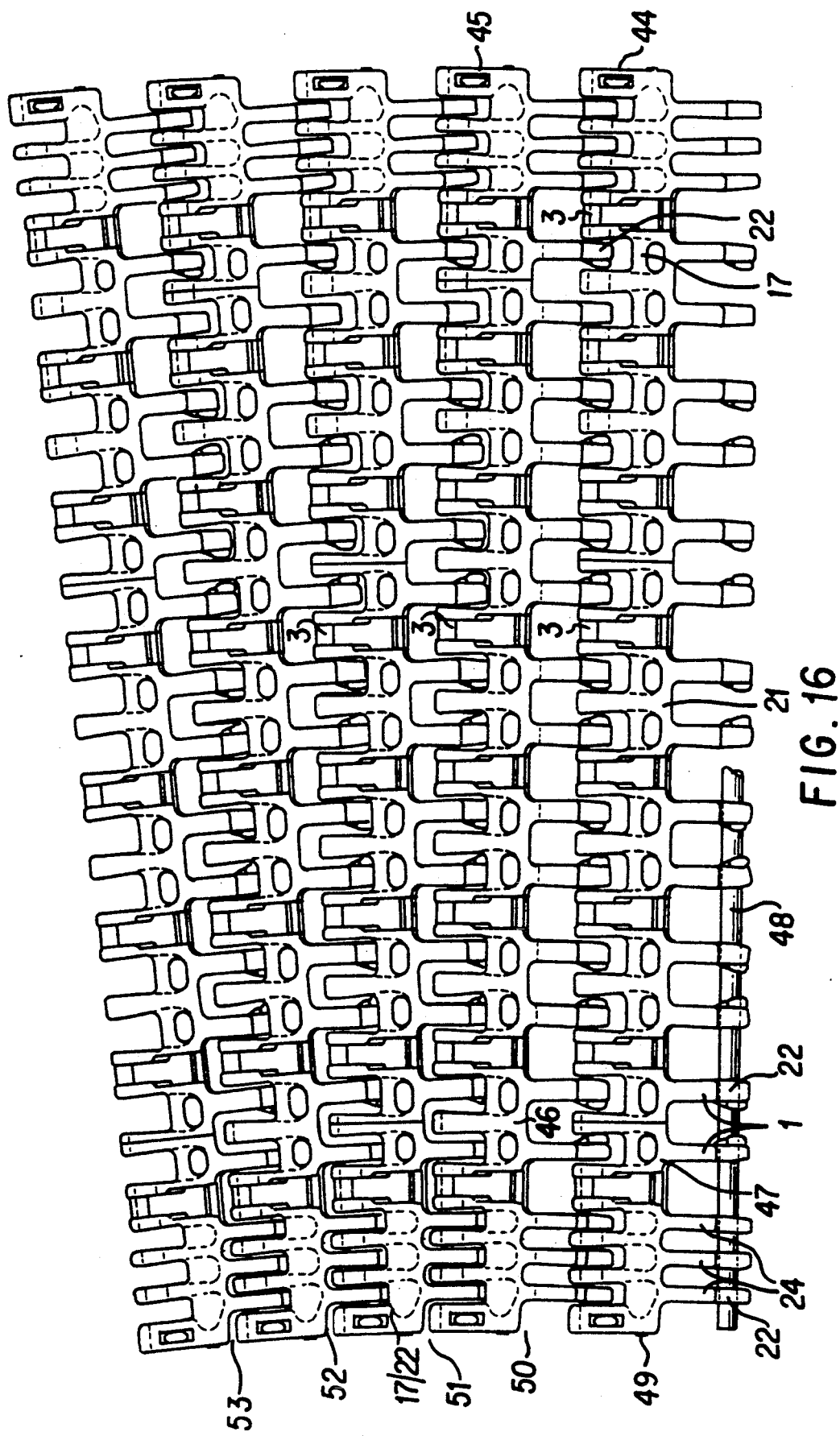
FIG. 16 is a top plan view of an assembled belt section with at least five different modules, internal modules, long and short, left and right end modules.

Referring now to FIG. 16, an assembled belt section is shown which has one or more internal modules 21, long and short right end modules 44 and 45, long and short left end modules 46 and 47, and pivot pins 48. In FIG. 16 pitch rows 49-50 are fully extended as would normally be the case while the belt is running straight. Pitch rows 50-51, 51-52, 52-53 are shown with the left edge collapsed and the right edge extended as would normally be the case in a belt traversing a left turn. Modules are assembled in bricklaid fashion with drive links 3 in line for sprocket wheel engagement. As can be seen, the resulting construction has a high percentage of open area and link element clearances for cleanability and flow-through. The reinforced edge structure is similar on both belt edges yielding a design capable of both left-hand and right-hand turns.

The advantage of the inverted "L" module structure with top elements 17 in cooperation with the link end undercuts 22 can be seen in FIG. 16. On the left, collapsed edge of the belt, ends of links 1 and 24 are nested underneath top elements 17 as provided by the undercuts 22 on the link ends. In the extended pitch position the undersides of top elements 17 and the top surface of undercuts 22 are exposed. This provides a structure with increased stiffness against gravity loads, as well as against forces which tend to bend or twist belt modules, while achieving an open, cleanable design with a minimum of opposite inwardly facing internal surfaces.

Figure 17:
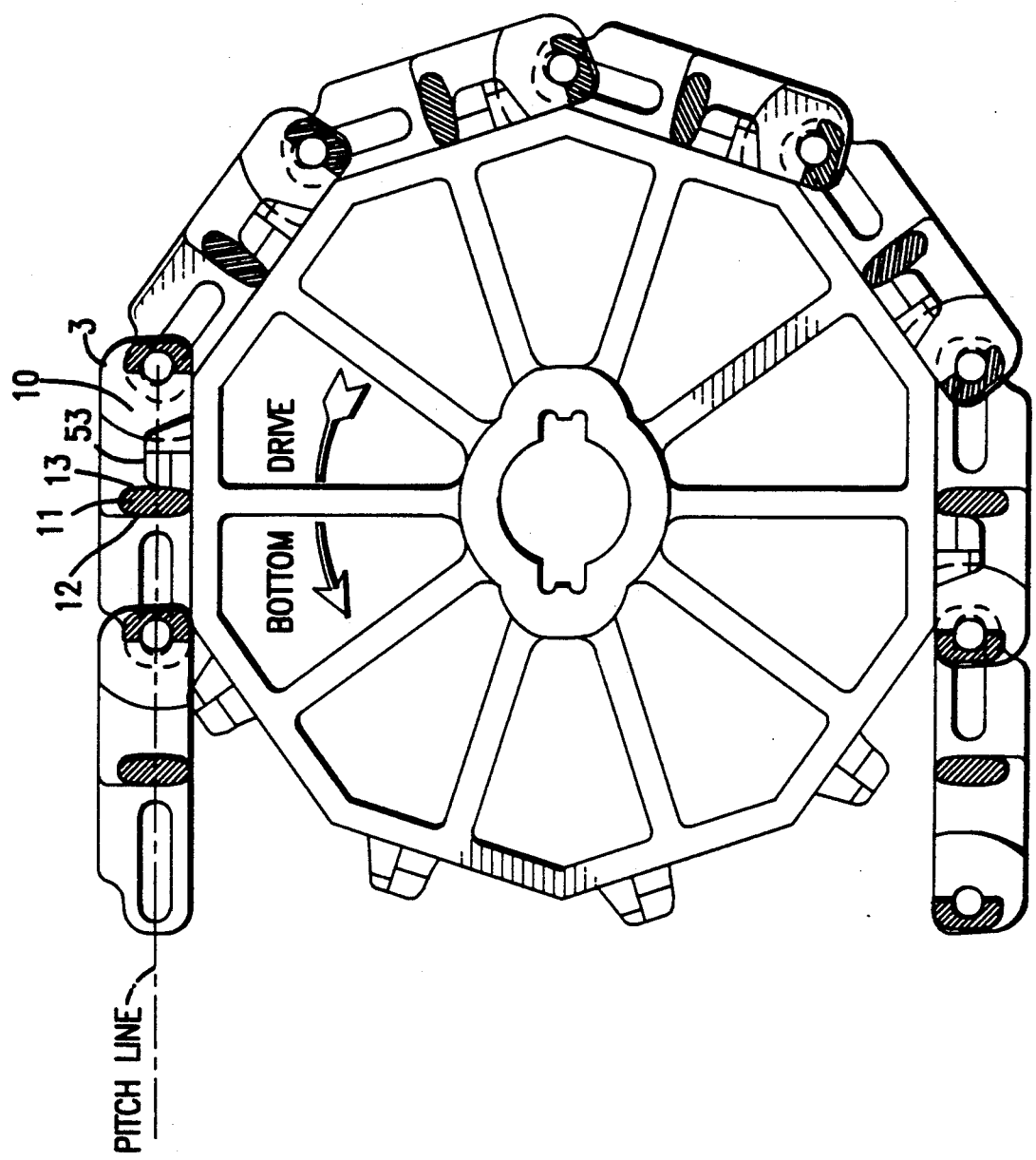
FIGS. 17, 18, 19 and 20 are side elevation partial sectional views of the belt of this invention illustrating the drive sprocket cooperation with the belt.
Figure 18:
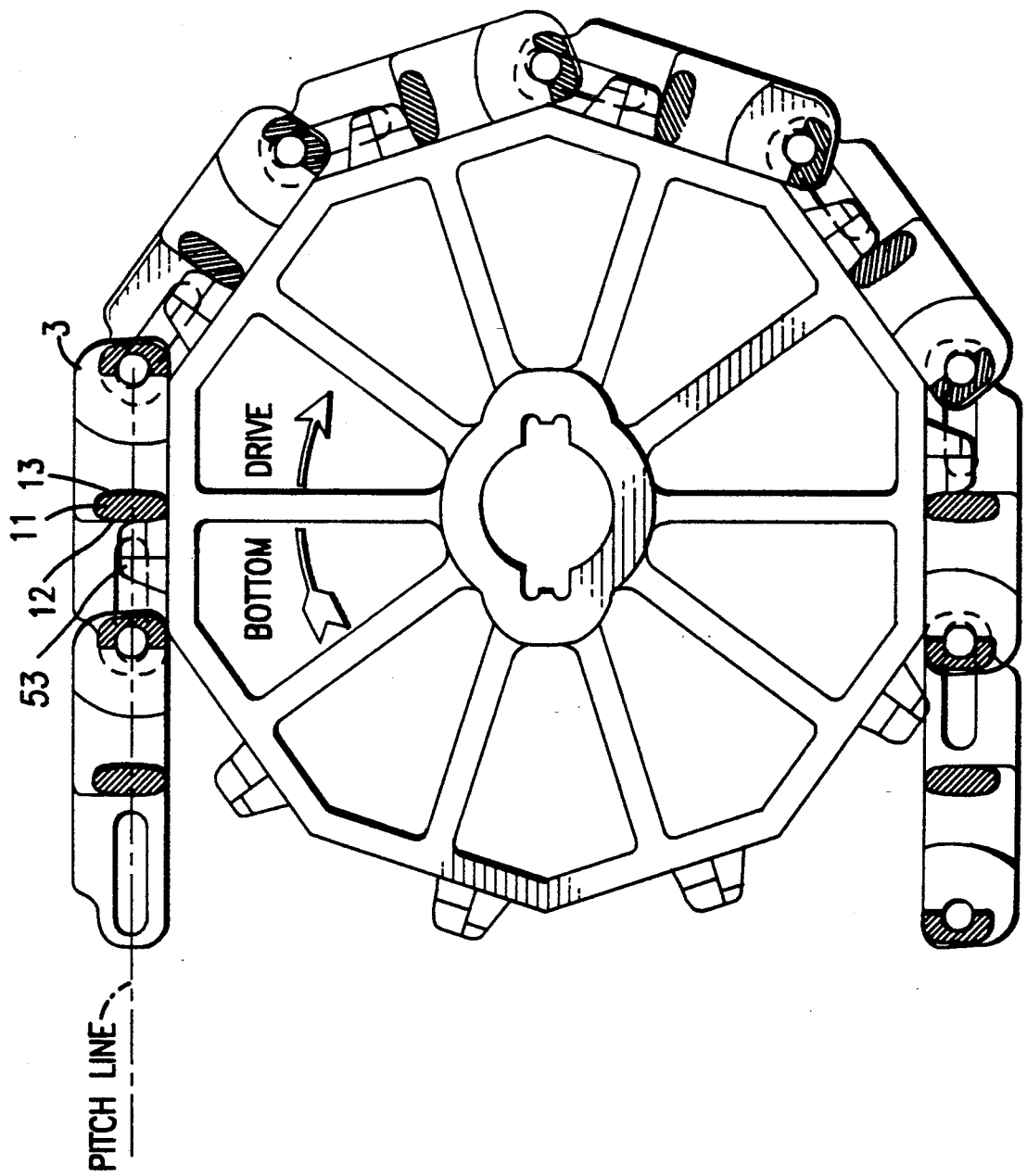
Figure 19:
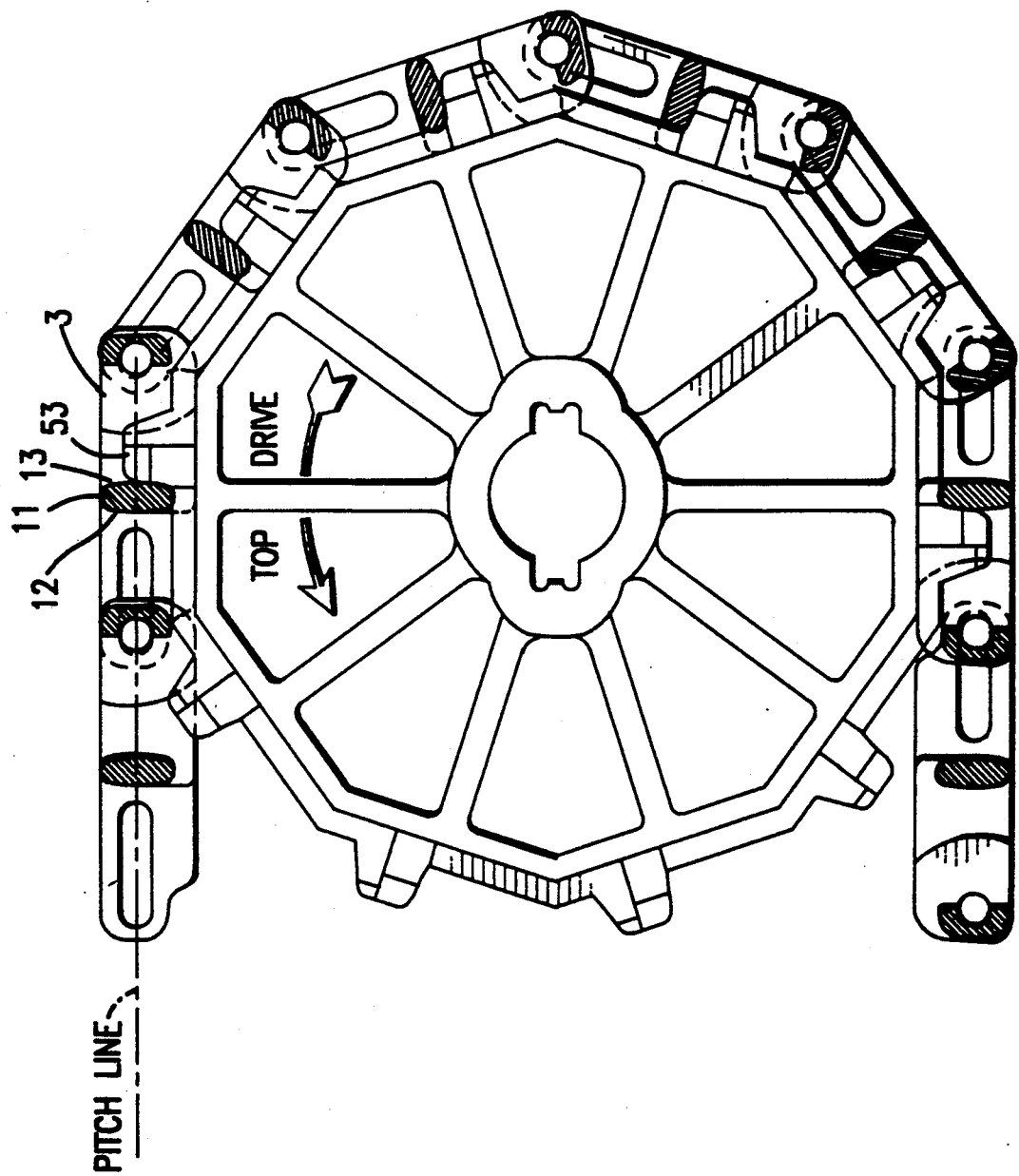
Figure 20:
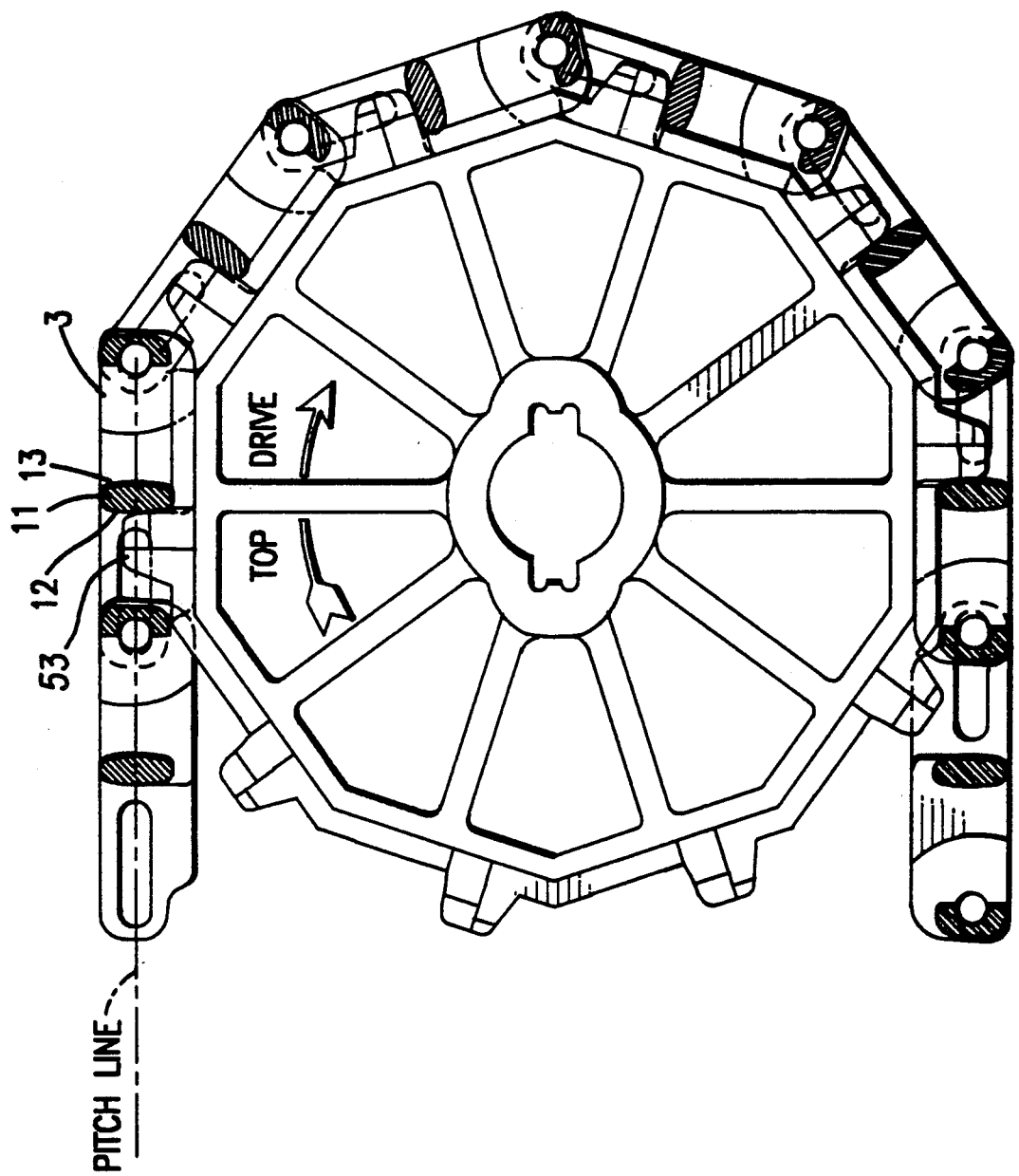

FIGS. 17-20 depict a partial assembly of the disclosed belt design shown in sectional view, in cooperation with a sprocket wheel for drive purposes. In each case, sprocket teeth 53 contact a portion of a drive surface 12, 13 of drive barrel 11 in drive link 3. Assuming a convention for descriptive purposes only that when the sprocket teeth 53 are located in the opening 10 of drive links 3 the belt is being forward driven, FIG. 17 shows the forward drive position with the belt bottom resting on the sprocket surface. FIG. 18 shows the reverse, bottom drive position. The disclosed invention can also be driven with the top surface of the belt resting on the sprocket as shown in FIGS. 19 and 20. FIG. 19 shows a top forward drive while FIG. 20 shows a top reverse drive. With each of the drive alternatives in FIGS. 17-20 the sprocket tooth 53 contacts the corresponding drive surface 12-13 at the pitch line for optimum drive efficiency. In addition, the drive action is correspondingly of equal efficiency with either alternative.

Figure 21:
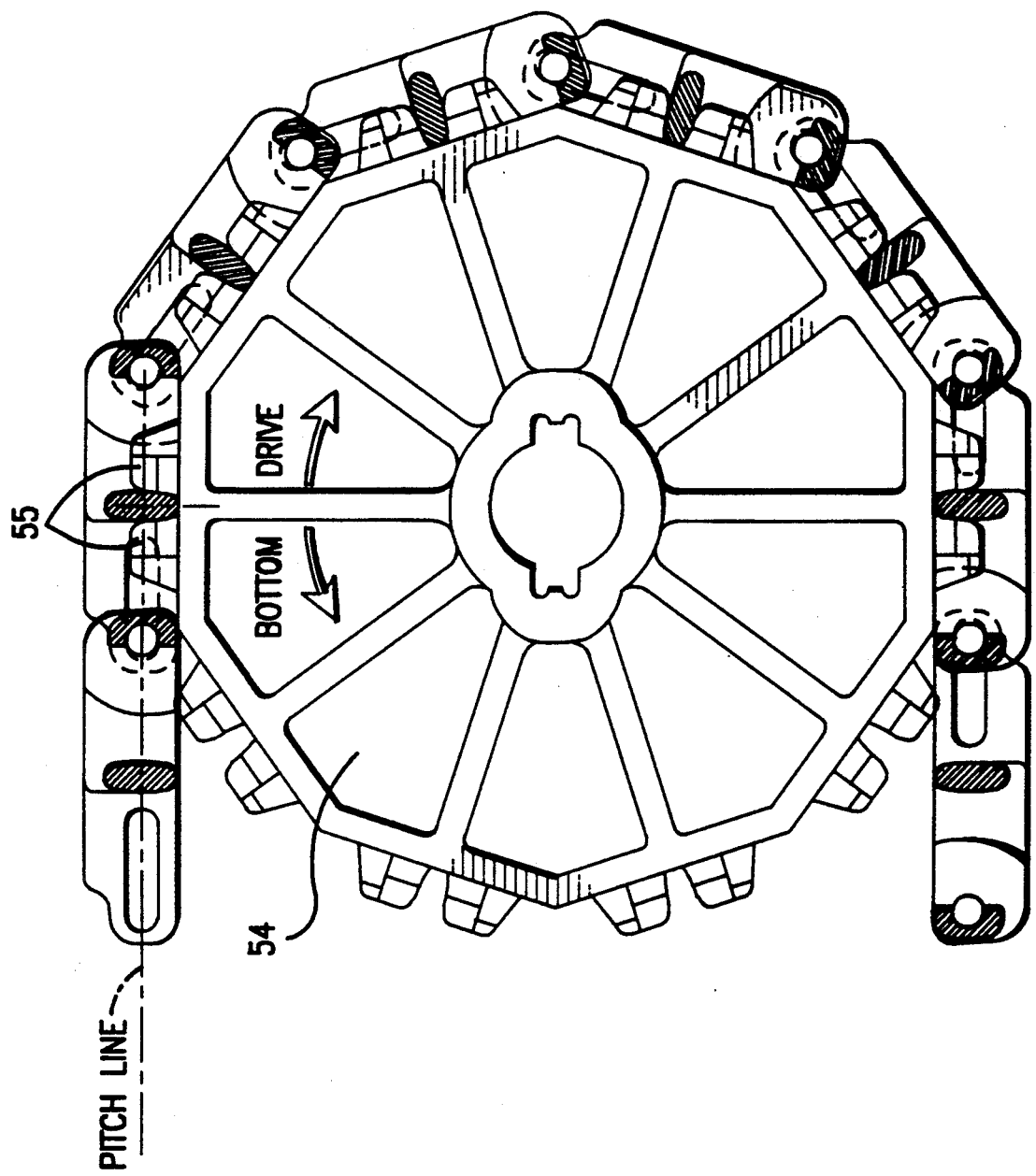
FIG. 21 is a side sectional view of the belt of this invention and another embodiment of a drive sprocket.

FIG. 21 shows a sprocket 54 with two sets of facing sprocket teeth 55. This sprocket can be utilized for bi-directional or reversing drives resulting in the ability to alternately drive the belt in either direction with the same sprocket wheel.

In a turn belt conveyor where the conveyor belt must run straight and negotiate a turn, and where the belt negotiates the turn by collapsing the inside belt pitch, a method must be provided for preventing the outside edge of the belt from rising or "flipping up" under conditions of high tension. An embodiment in which this is accomplished is shown in FIGS. 22A, B and C. On the modules which form the outside edge of the belt is a finger-like projection 70. This projection cooperates with a guide rail on the conveyor frame to restrict the upward movement of the outer belt edge. The embodiment shown in FIGS. 22A, B and C accomplishes this restriction in belt movement without a conveyor projection in the product path, without reducing the effective belt width, and without increasing the belt thickness or conveyor depth.

Figure 23C:
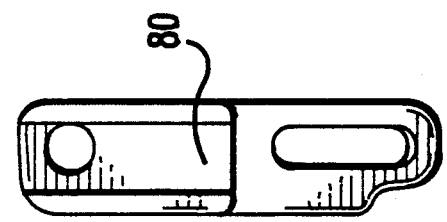
FIGS. 23A, B and C are views similar to FIGS. 22A, B, and C, of another embodiment illustrating another hold down arrangement.
Figure 23B:
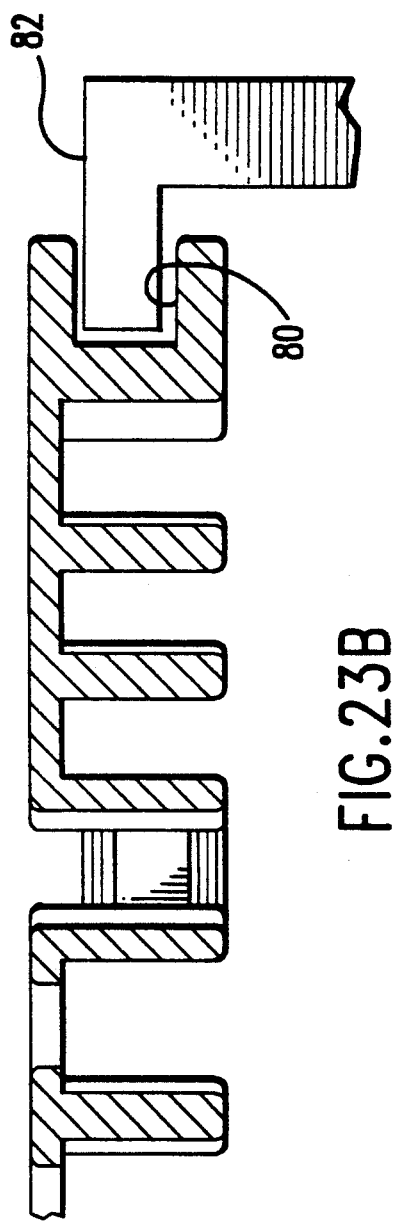
Figure 23A:
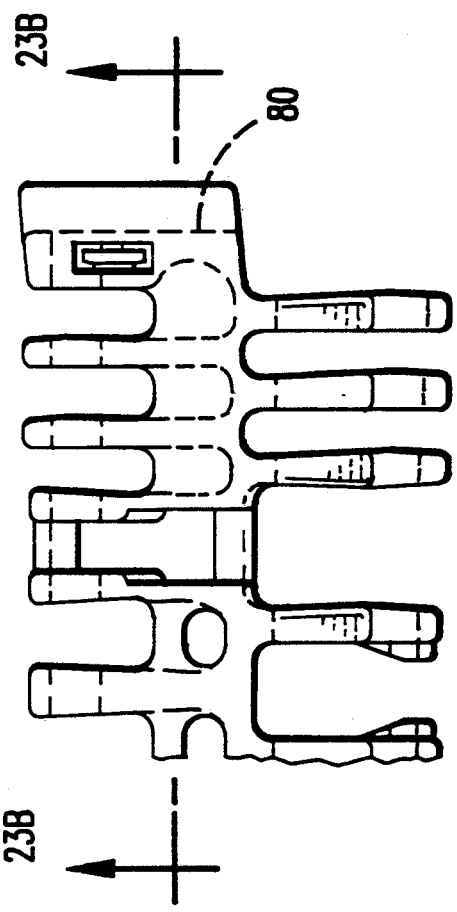

Another embodiment of a hold-down of this invention is shown in FIGS. 23A, B and C. In this configuration the basic belt design can be as described above. On the modules which form the outside edge of the belt is a longitudinal groove 80. This groove cooperates with a guide rail 82 on the conveyor frame. This embodiment offers the advantage of utilizing the full belt width as the "effective" belt width, again without increasing belt thickness or conveyor depth. It also offers the advantage of being symmetric about the centerline of the belt, therefore, both belt surfaces can be used as the top, product surface.

Figure 24:
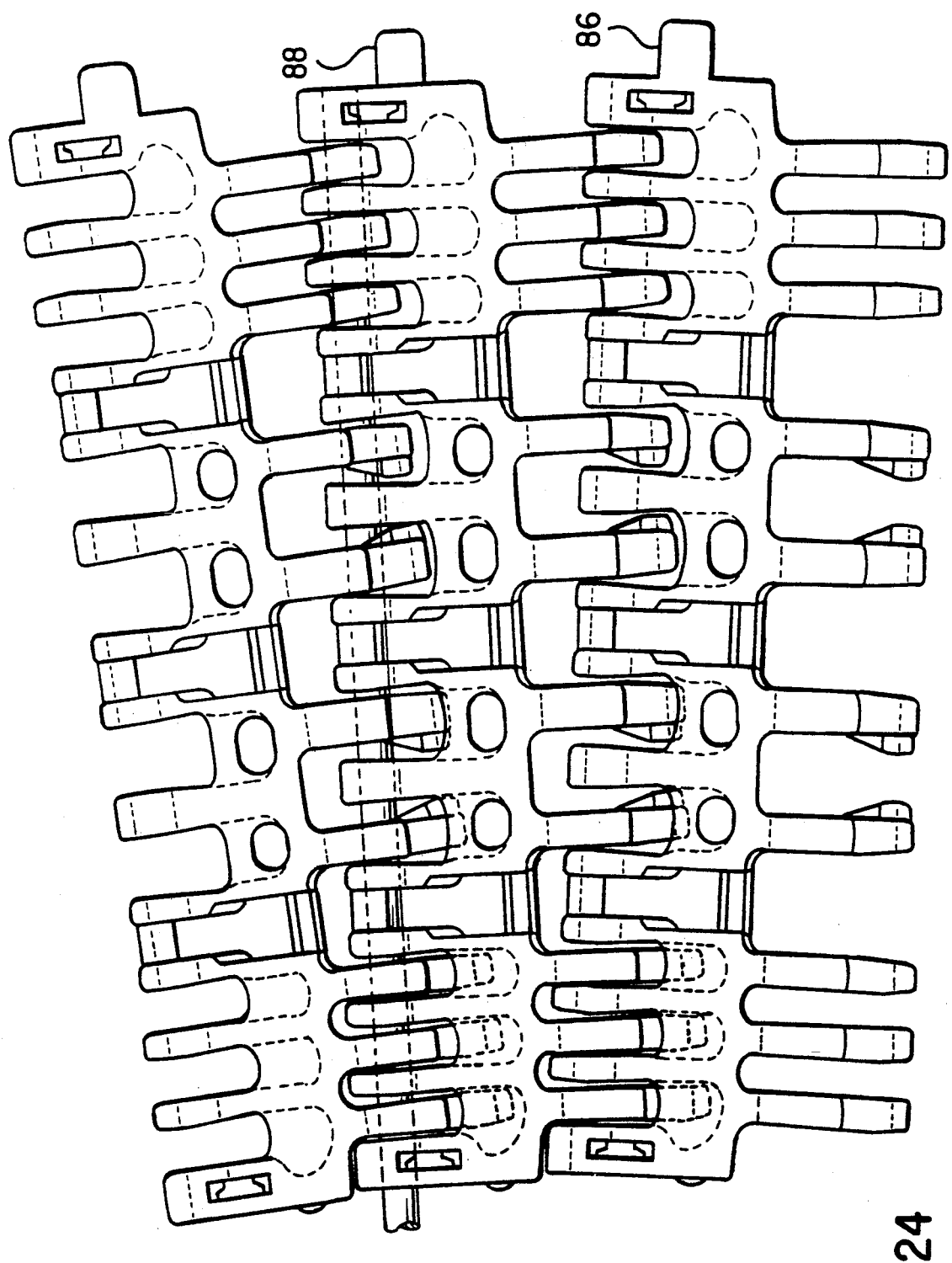
FIG. 24 is a top plan view of assembled belts illustrating a further hold down embodiment.

A third embodiment of a hold-down is shown in FIG. 24. In this configuration, the basic belt design can be as described above. The modules which form the outside edge of the belt have, on alternating pitches, fingers 86 and 88 which extend outward, where on one set of pitches the finger 86 emanates from the upper portion of the module, and on a second set of pitches the finger 88 emanates from the bottom portion of the module. This embodiment offers all the advantages of the design shown on FIG. 23, plus it is easier to clean due to the absence of the enclosed pocket. It also is much easier to mold or cast due to the absence of an undercut. It must be understood that this design is not restricted to alternating top and bottom finger modules, but that other combinations, for example two top finger modules to one bottom finger module, could be advantageously used.

Yet another hold-down embodiment is illustrated in FIGS. 25A, B and C. Again, the basic belt configuration can be described above. On modules which form the outside edge of the belt are some combination of upper and lower fingers 90 and 92, with no overlap. This offers the advantages of full belt width utilization, utilization of both belt surfaces, and ease of cleaning. In addition, this embodiment eliminates the manufacturing problems associated with an undercut condition. This embodiment also offers the potential for a more continuous product support surface due to the shorter gap distance, and this embodiment uses similar tab configuration modules for all pitches.

It must be understood that the use of any of the disclosed embodiments is not restricted to the basic belt internal designs used to illustrate the inventions. Similarly, the disclosed inventions can, and in many cases should, be utilized on both outside and inside belt edges. The disclosed inventions are also not restricted to plastic conveyor belting but also have application to metal conveyor belts and conveyor belts made of other rigid materials. Finally, any of the disclosed embodiments do not necessarily have to be used on every pitch of the conveyor belt, but rather could be spaced apart by distances appropriate to the particular application.

In modular plastic conveyor belts for both straight line and turn applications, improved methods are required for retaining the pivot pins within the belt. One means of pivot pin retention was disclosed in U.S. Pat. No. 4,893,710. In that patent a blocking member is inserted in a slot in the outermost link end occluding the rod hole preventing the pivot rod from moving outward, thereby retaining it within the belt. The potential construction is advantageous where there is little clearance between intermeshing links on adjoining modules and the belt width is stabilized by same. However, where there are large clearances between adjoining links and the belt width can freely expand to the extent of these clearances, it is sometimes desirable to utilize the pivot pin to fix the belt width.

Figure 26B:
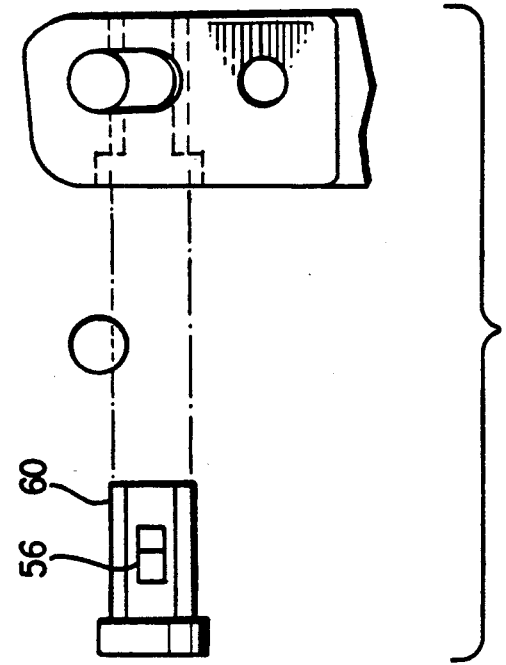
FIG. 26B is an exploded end elevation view of an embodiment for capturing a pivot rod.
Figure 26A:
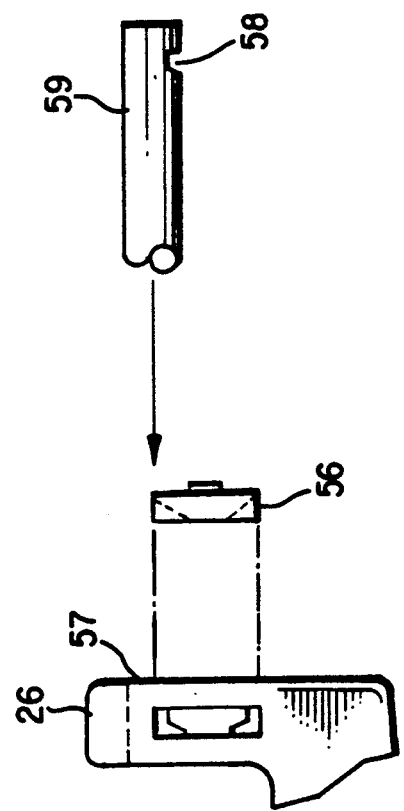
FIG. 26A is an exploded side elevation view of an embodiment for capturing a pivot rod.

FIGS. 26A and B show an advancement in the art of this invention. A locking pin 56 cooperates with an opening 57 in outer link end 26. A notch 58 is formed near the end of the pivot pin 59. Pin 59 is inserted in the belt with notch 58 in alignment with opening 57. Locking pin 56 is inserted in opening 57 with surface 60 cooperating with notch 58. With this method utilized on both side edges of the belt, the pivot pin is utilized to prevent any outward movement of the end modules, thereby stabilizing the belt width.

Figure 27:
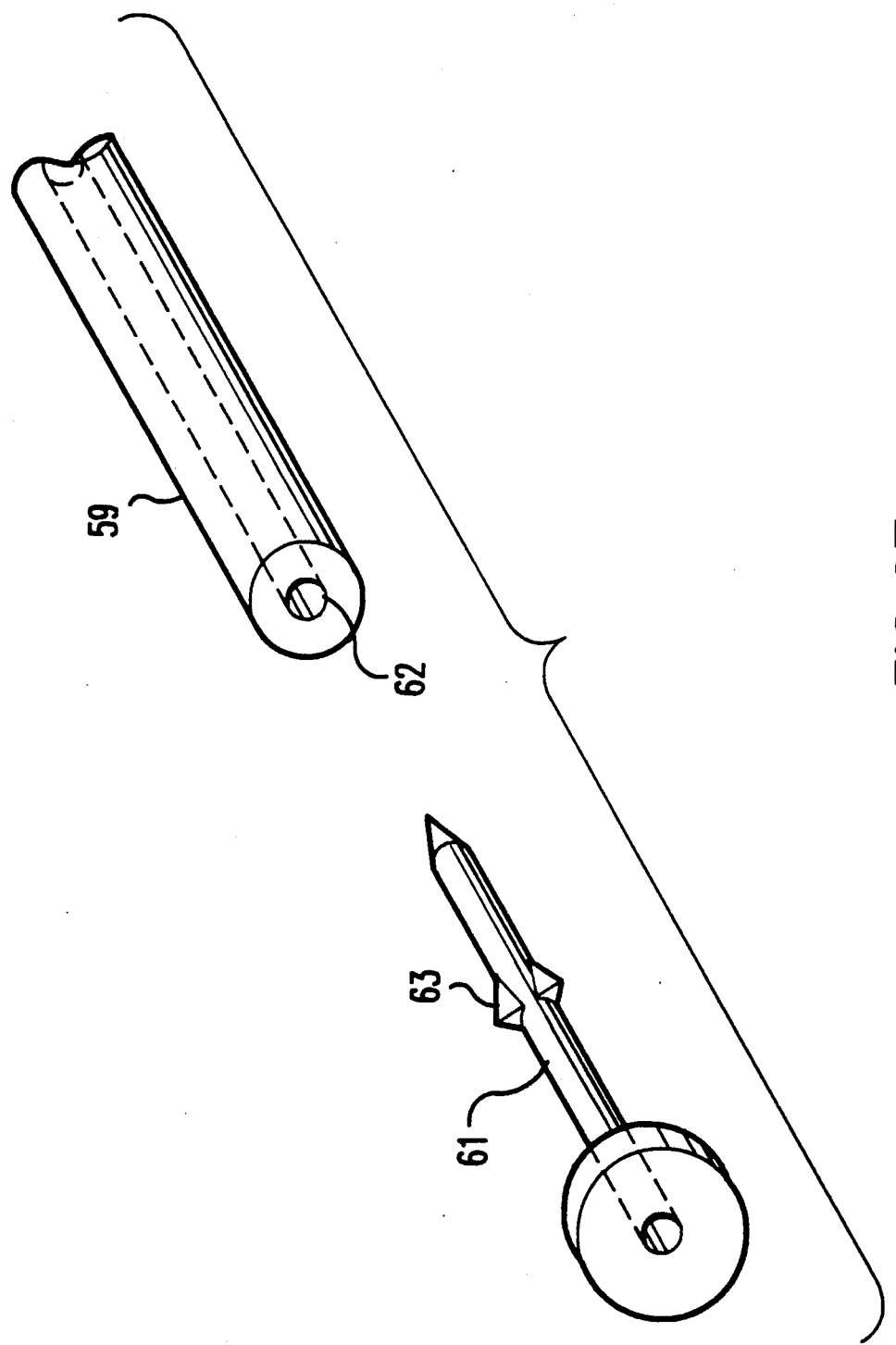
FIG. 27 is an exploded perspective view of another pivot rod retention embodiment of this invention.

Another rod retention embodiment is disclosed in FIG. 27. In this embodiment a pin 61 is inserted into a hole 62 in the end of pivot rod 59. The shank of the pin 61 may have tapered barbs 63 or other methods known in the art to achieve unequal force requirements in insertion and extraction. The head of the pin is larger than the diameter of the rod 59 and the module pivot pin opening 6 which prevents movement of the rod, thereby stabilizing the belt width. Additionally, the pin can be constructed from a higher strength material than the pivot pin, thereby increasing the shear strength of the pivot pin at the outer belt edge where shear stresses are greatest when the belt is negotiating a turn.

Figure 28:
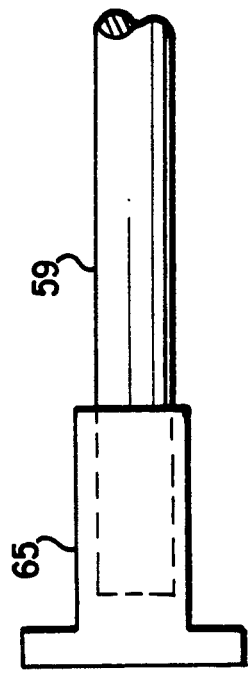
FIG. 28 is a side elevation view of a further alternative embodiment of a pivot rod retention arrangement.

An alternate embodiment of a rod retaining pin is disclosed in FIG. 28 where a sleeve 65 is pressed over the pivot pin 59. The sleeve may be pressed on using an interference projection, threaded on the pivot pin, or adhesively fixed to the pivot pin.

Figure 29B:
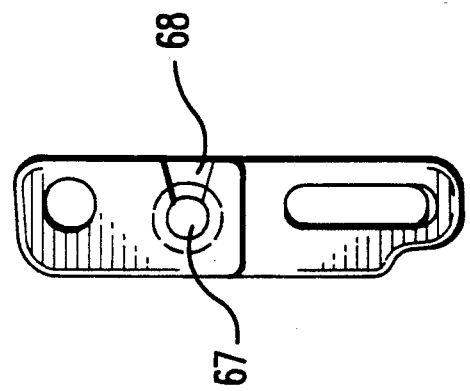
FIG. 29B is an end elevation view illustrating an embodiment for increasing drive friction.
Figure 29A:
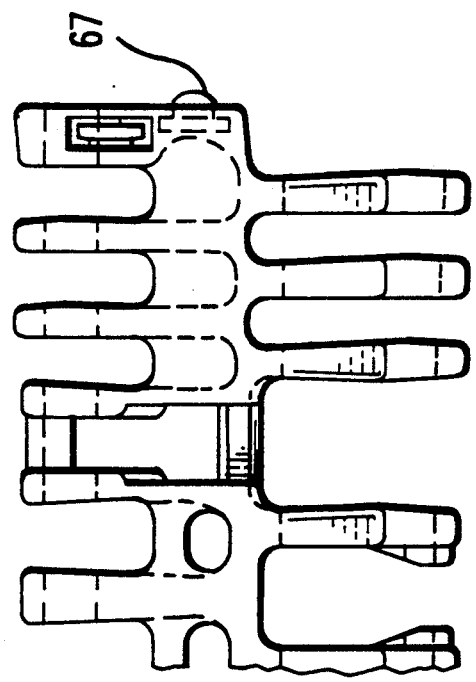
FIG. 29A is a plan view of a portion of an end module.

In spiral cage conveyor systems, the main driving force for the belt is achieved by frictional contact between the belt edge and conveyor drive elements. At times it is desirable to increase the traction between the belt edge and the conveyor drive elements. This may be achieved as shown in FIGS. 29A and B with drive buttons 67 located on the outer edge of the end module which cooperate with grooved drive elements (not shown but as are conventional in the art). Drive buttons 67 may be integrally molded from the same material as the end module or alternately insert-molded using a different, higher friction material for improved drive friction. In the FIG. 29 embodiment drive button 67 is pressed or snap-fit into an opening 68 in an end module. This presents the advantages of using a different high friction material for the drive button, and yields a module where the drive button can be easily replaced as when it wears out or when different friction characteristics are desired.

Figure 30A:
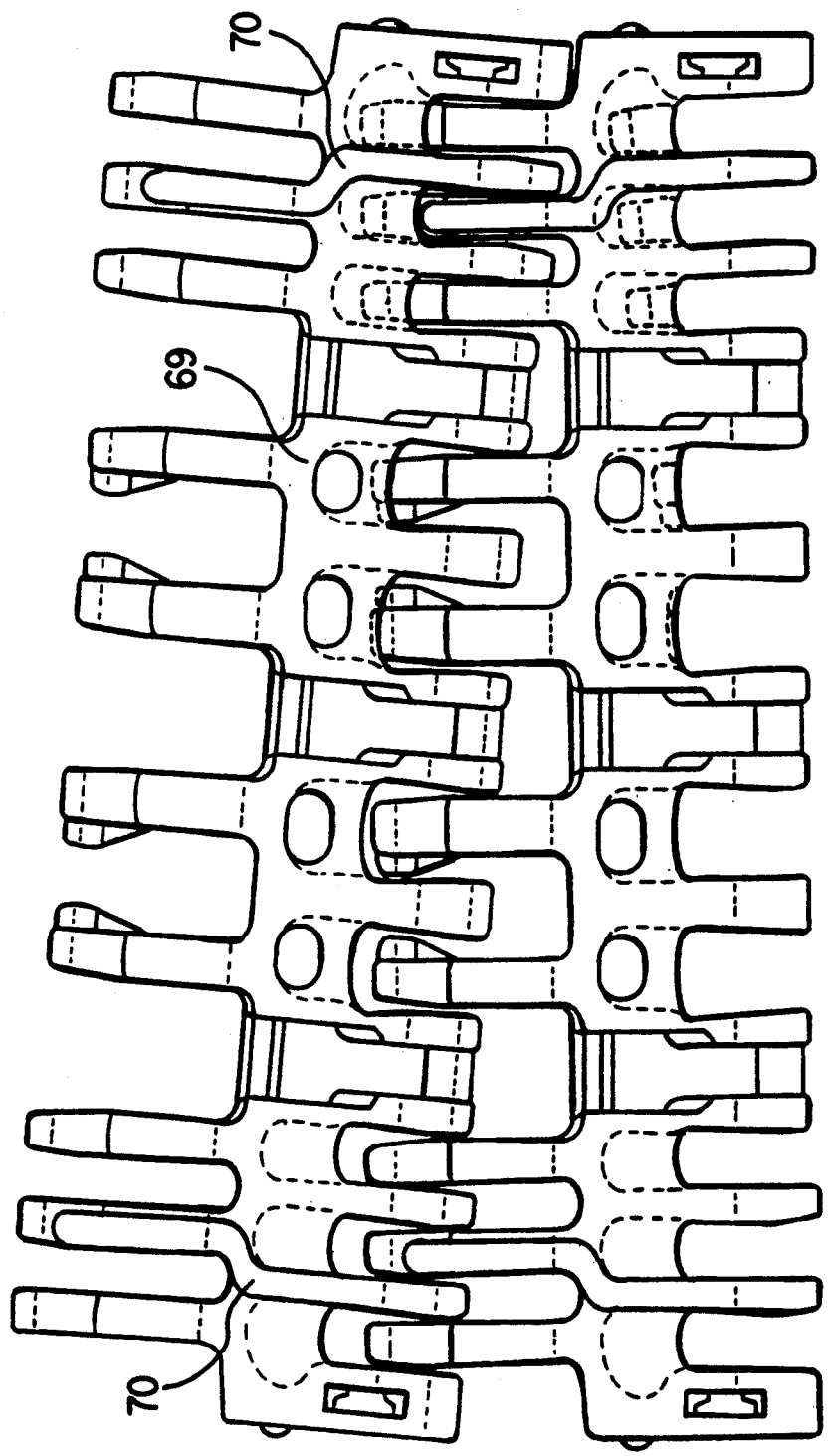
FIG. 30A is a top plan view of a modular plastic belt with integrally molded offset side plates to prevent product from falling off the belt.
Figure 30B:
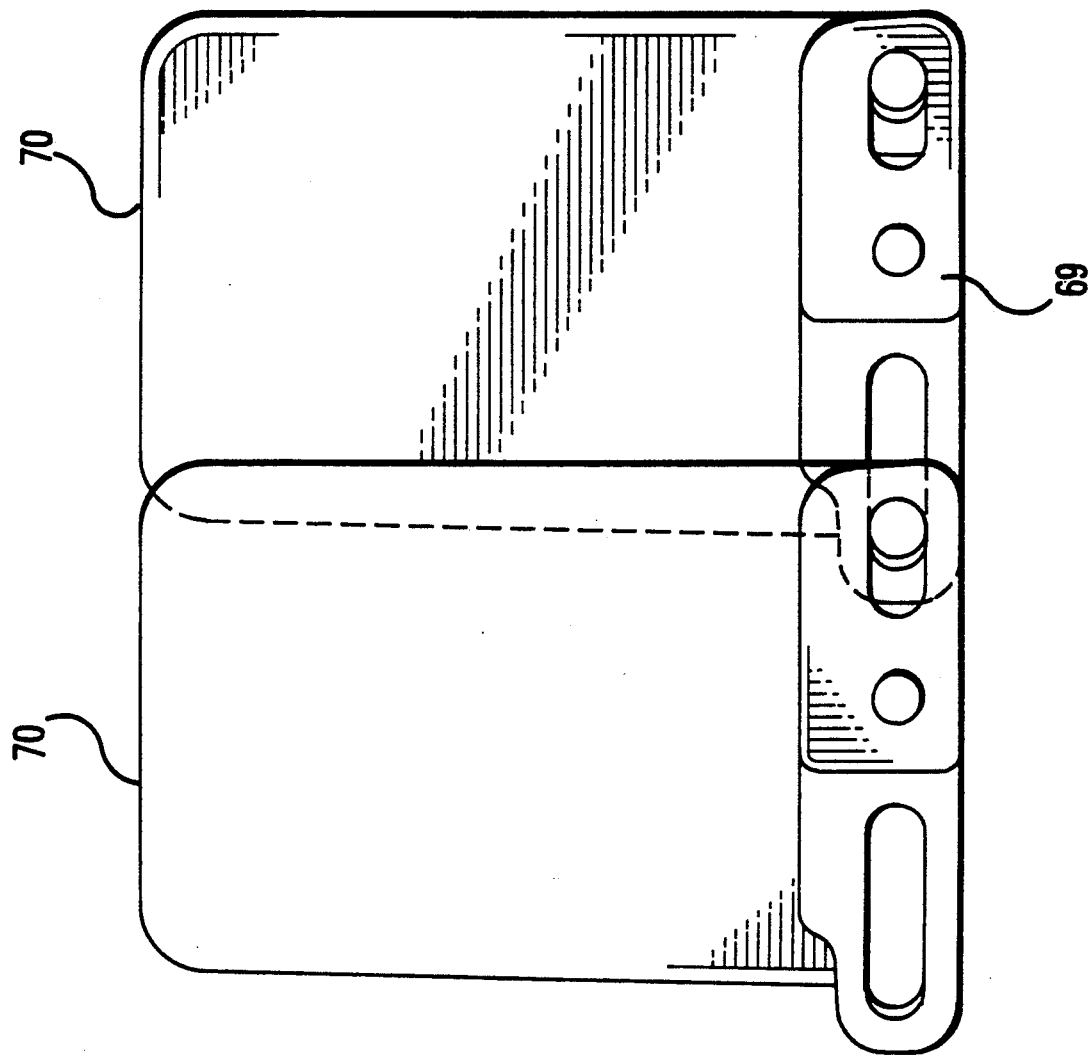
FIG. 30B is a side view of a modular plastic belt with integrally molded offset side plates to prevent product from falling off the belt.

FIGS. 30A and B show a modular plastic turn belt 69 with integrally molded offset side plates 70 used to prevent product which is being carried from falling off the side of the belt.

What is claimed is:

1. A module for a modular plastic belt conveyor, the module being of the type having a plurality of links on a molded body, the links extending outwardly of the body for the reception of linking pivot rods, with improvements comprising:
   one plurality of link ends having aligned slots for reception of a pivot rod, the other plurality of links having aligned holes with diameters slightly greater than the diameter of the pivot rod, certain pairs of adjacent pivot links of the other plurality of link ends being connected adjacent their outer edge by a link end connecting member to form a portion of a drive sprocket hole, and a portion of the molded body between the two pluralities of link ends being in the form of a symmetrical drive barrel which is shaped to cooperate with a sprocket tooth to be driven from either side surface.

2. A module as defined in claim 1 wherein each of the link ends of the one plurality of link ends have side pads to provide additional pivot rod bearing area and to cooperate with the flanks of the other plurality of link ends of an adjacent module.

3. A module as defined in claim 1 wherein the molded body further comprises a stiffening member along at least a portion of the top surface.

4. A module as defined in claim 3 wherein the molded body includes perforations through it from top to bottom in order to improve cleanability and air flow through the conveyor.

5. A module as defined in claim 1 wherein the link end connecting member provides additional pivot rod contact area.

6. A module as defined in claim 1 in which an upper outer edge of one set of link ends is undercut to provide clearance for positioning links of adjacent modules of a belt of collapsing modules.

7. An end module for a modular plastic conveyor belt, the end module to be used with intermediate modules in assembling the belt, the end module having a plurality of link ends on each side for receiving a pivot rod and an integral molded body, with improvements comprising: a series of internal link ends and a series of outermost link ends, the outermost link ends having a configuration differing from the innermost link ends, the outermost series of link ends on at least one side of the module thinner in width and much more closely spaced than internal link ends to provide a high strength edge for the module which has capability for collapsing in turns.

8. A modular plastic turn belt consisting solely of modules having a plurality of links ends on each side of each module for receiving a pivot rod and an integrally molded body with improvements comprising outermost link ends of belt edge modules on at least one side being thinner in width and much more closely spaced than internal link ends of the edge module to provide a high strength belt edge and a belt which has collapsibility in turning on each side.

9. An end module as defined in claims 7 or 8 wherein all the link ends but the outermost one have tapered faces to provide link clearances in a turn.

10. A modular plastic turn belt as defined in claim 9 with the further improvement comprising:
the end modules being molded from a higher strength material than the internal modules to improve edge strength of the belt.

11. A modular plastic turn belt as defined in claim 8 with further improvement comprising:
a taper means for the rod and holes to provide a taper at an angle to the axis of the holes in a direction away from a pitch center and with the vertex of the angle in the axis internally of the belt in order to move the pitch controlling point inside the belt edge to increase the collapsibility of the belt and improve force distribution at the outer edge of the belt.

12. A modular plastic turn belt as defined in claim 11 wherein the taper means comprises a taper of the holes in at least the outermost link ends.

13. A modular plastic turn belt as in claim 11 wherein the taper means comprises a taper on the end of the pivot rod.

14. A modular plastic belt formed of end modules and internal modules, all of the modules having a plurality of interfitting extending link ends on each side thereof and a molded body, most of the link ends of the end modules being thinner in width and more closely spaced at the outer edge thereof than the link ends of the internal modules, the internal modules having a symmetrical drive barrel along the mid portion thereof to be driven in either direction.

15. A modular plastic belt as defined in claim 14 wherein, the symmetrical drive barrel along the mid portion of the internal module is symmetrical from both the top and bottom of the module so that the belt may be driven by the sprocket from either the top or the bottom of the belt.

16. An end module for a plastic conveyor belt a defined in claim 8 with further improvements in the pivot rod retention means comprising: an outer link end with an opening extending transverse to the pivot rod, a notch means adjacent the end of the pivot rods, and a locking pin insertable into the opening and cooperating with the notch to capture and hold the pivot rod.

* * * * *